United States Patent
Agrawal et al.

(10) Patent No.: US 10,454,553 B2
(45) Date of Patent: Oct. 22, 2019

(54) BEAM FORMING METHOD FOR A TRANSMITTING ANTENNA AND A DEVICE THEREOF

(71) Applicants: Samsung Electronics Co., Ltd, Suwon-si (KR); Delhi Technological University, Delhi (IN)

(72) Inventors: Sachin Kumar Agrawal, Uttar Pradesh (IN); Kapil Sharma, Delhi (IN)

(73) Assignees: Samsung Electronics Co., Ltd., Suwon-si (KR); Delhi Technological University, Delhi (IN)

( * ) Notice: Subject to any disclaimer, the term of this patent is extended or adjusted under 35 U.S.C. 154(b) by 10 days.

(21) Appl. No.: 15/909,546

(22) Filed: Mar. 1, 2018

(65) Prior Publication Data
US 2018/0254811 A1    Sep. 6, 2018

(30) Foreign Application Priority Data
Mar. 1, 2017  (IN) .............................. 201711007315

(51) Int. Cl.
| | | |
|---|---|---|
| *H04B 7/02* | (2018.01) | |
| *H04B 7/06* | (2006.01) | |
| *H04L 12/26* | (2006.01) | |
| *G01S 13/06* | (2006.01) | |
| *H04W 84/04* | (2009.01) | |
| *H04W 88/08* | (2009.01) | |
| *G01S 13/34* | (2006.01) | |
| *G01S 13/42* | (2006.01) | |

(52) U.S. Cl.
CPC ............ *H04B 7/0617* (2013.01); *G01S 13/06* (2013.01); *H04L 43/16* (2013.01); *G01S 13/34* (2013.01); *G01S 13/42* (2013.01); *H04W 84/042* (2013.01); *H04W 88/08* (2013.01)

(58) Field of Classification Search
CPC ....... H04B 7/0617; G01S 13/06; H04L 43/16; H04W 84/042; H04W 88/08
USPC ......................................................... 375/267
See application file for complete search history.

(56) References Cited

U.S. PATENT DOCUMENTS

| | | | |
|---|---|---|---|
| 6,369,756 B1 | 4/2002 | Wang et al. | |
| 6,453,177 B1 * | 9/2002 | Wong ..................... | H01Q 1/246 455/450 |
| 7,782,251 B2 | 8/2010 | Bishop et al. | |
| 8,040,278 B2 * | 10/2011 | Maltsev ............... | H01Q 3/2605 342/378 |
| 9,246,216 B2 * | 1/2016 | Harel .................. | H04B 7/0404 |

(Continued)

OTHER PUBLICATIONS

Xia Zhou, et al ("Mirror Mirror on the Ceiling: Flexible Wireless Links for Data Centers", Department of Computer Science, U. C. Santa Barbara, USA §Xi'an Jiaotong University, P. R. China †Google and U. C. San Diego, USA, SIGCOMM'12, Aug. 13-17, 2012, Helsinki, Finland, pp. 443-454).*

(Continued)

*Primary Examiner* — Helene E Tayong

(57) ABSTRACT

The disclosure relates to method and device for beam forming in cellular communication systems. In accordance with one embodiment, the device selects at least one obstruction free zone and at least one obstruction free beam window, the at least one obstruction free beam window being selected within the at least one obstruction free zone. The device forms at least one beam based on said at least one obstruction free beam window thus selected.

12 Claims, 18 Drawing Sheets

(56) References Cited

U.S. PATENT DOCUMENTS

| 2015/0195026 A1 | 7/2015 | Sagong et al. |
| 2016/0014722 A1 | 1/2016 | Yoon et al. |
| 2016/0072563 A1 | 3/2016 | Lee et al. |
| 2016/0363651 A1* | 12/2016 | Lim .......................... G01S 7/34 |

OTHER PUBLICATIONS

Lorenzo Carlo Pansana("Transmit-Receive Beamforming for 60GHz Indoor Wireless Communications",Aalto University School of Science and Technology, Faculty of Electronics, Communications and Automation, Thesis submitted for examination for the degree of Master of Science in Technology. Espoo Aug. 6, 2010 , pp. 1-87).*

* cited by examiner

BEAM FORMING METHOD FOR A TRANSMITTING ANTENNA AND A DEVICE THEREOF

CROSS-REFERENCE TO RELATED APPLICATION AND CLAIM OF PRIORITY

This application is based on and claims priority under 35 U.S.C. § 119 to India Patent Application No. 201711007315 filed on Mar. 1, 2017 in the India Intellectual Property Office, the disclosure of which is incorporated by reference herein in its entirety.

TECHNICAL FIELD

The present disclosure relates to a method and device for beam forming in cellular communication systems.

BACKGROUND

In a cellular communication system that supports beam forming, a base station and a terminal may form a plurality of beams for signal transmission and reception. Particularly, each of the base station and the terminal may select an optimal beam of a plurality of beams according to a beam forming protocol, and transmit and receive a signal using the selected beam. In general, the beam forming protocol includes a beam tracking procedure that is performed continuously in a background. The beam tracking procedure involves scanning a wide spectrum of reflected signals to obtain relevant parameters for optimal beam forming, thereby increasing time, load, and power consumption.

Thus, there exists a need for a solution to overcome above-mentioned deficiencies.

SUMMARY

This summary is provided to introduce a selection of concepts in a simplified format that are further described in the detailed description of the disclosure. This summary is not intended to identify key or essential inventive concepts of the claimed subject matter, nor is it intended for determining the scope of the claimed subject matter.

In accordance with the purposes of the disclosure, the present disclosure as embodied and broadly described herein, provides for method and device for beam forming in cellular communication systems.

In one embodiment of the present disclosure, a beam is formed for a transmitting antenna. Accordingly, at least one obstruction free zone and at least one obstruction free beam window is selected. The at least one obstruction free beam window is selected within said at least one obstruction free zone. Based on said at least one obstruction free beam window thus selected, at least one beam is formed.

The advantages of the disclosure include, but not limited to, forming an efficient and high direction beam based on obstruction free beam window with minimal losses. Further, time, load, and power consumption for beam forming is considerably reduced as the obstruction free beam window is selected within obstruction free zone and beam formation is based on the obstruction free beam window.

These aspects and advantages will be more clearly understood from the following detailed description taken in conjunction with the accompanying drawings and claims.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Figure 1:
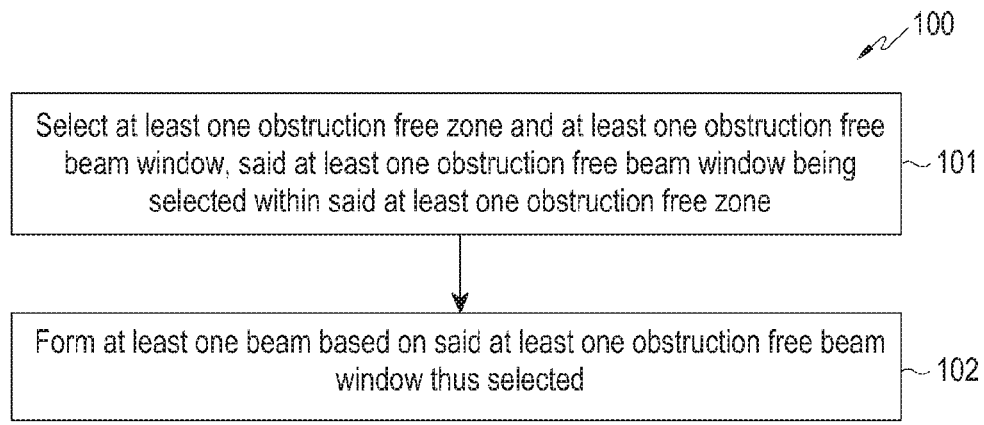
FIG. 1 illustrates a method for beam forming for a transmitting antenna, according to an embodiment of the present disclosure.

It may be noted that to the extent possible, like reference numerals have been used to represent like elements in the drawings. Further, those of ordinary skill in the art will appreciate that elements in the drawings are illustrated for simplicity and may not have been necessarily drawn to scale. For example, the dimensions of some of the elements in the drawings may be exaggerated relative to other elements to help improve understanding of aspects of the disclosure. Furthermore, the one or more elements may have been represented in the drawings by conventional symbols, and the drawings may show only those specific details that are pertinent to understanding the embodiments of the disclosure so as not to obscure the drawings with details that will be readily apparent to those of ordinary skill in the art having benefit of the description herein.

DETAILED DESCRIPTION

FIGS. 1 through 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

It should be understood at the outset that although illustrative implementations of the embodiments of the present disclosure are illustrated below, the present disclosure may be implemented using any number of techniques, whether currently known or in existence. The present disclosure should in no way be limited to the illustrative implementations, drawings, and techniques illustrated below, including the exemplary design and implementation illustrated and described herein, but may be modified within the scope of the appended claims along with their full scope of equivalents.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments or to one embodiment or to several embodiments or to all embodiments. Accordingly, the term "some embodiments" is defined as meaning "no embodiment, or one embodiment, or more than one embodiment, or all embodiments."

The terminology and structure employed herein is for describing, teaching and illuminating some embodiments and their specific features and elements and does not limit, restrict or reduce the spirit and scope of the claims or their equivalents.

More specifically, any terms used herein such as but not limited to "includes," "comprises," "has," "consists," and grammatical variants thereof do NOT specify an exact limitation or restriction and certainly do NOT exclude the possible addition of one or more features or elements, unless otherwise stated, and furthermore must NOT be taken to exclude the possible removal of one or more of the listed features and elements, unless otherwise stated with the limiting language "MUST comprise" or "NEEDS TO include."

Whether or not a certain feature or element was limited to being used only once, either way it may still be referred to as "one or more features" or "one or more elements" or "at least one feature" or "at least one element." Furthermore, the use of the terms "one or more" or "at least one" feature or element do NOT preclude there being none of that feature or element, unless otherwise specified by limiting language such as "there NEEDS to be one or more . . . " or "one or more element is REQUIRED."

Unless otherwise defined, all terms, and especially any technical and/or scientific terms, used herein may be taken to have the same meaning as commonly understood by one having an ordinary skill in the art.

Reference is made herein to some "embodiments." It should be understood that an embodiment is an example of a possible implementation of any features and/or elements presented in the attached claims. Some embodiments have been described for the purpose of illuminating one or more of the potential ways in which the specific features and/or elements of the attached claims fulfil the requirements of uniqueness, utility and non-obviousness.

Use of the phrases and/or terms such as but not limited to "a first embodiment," "a further embodiment," "an alternate embodiment," "one embodiment," "an embodiment," "multiple embodiments," "some embodiments," "other embodiments," "further embodiment", "furthermore embodiment", "additional embodiment" or variants thereof do NOT necessarily refer to the same embodiments. Unless otherwise specified, one or more particular features and/or elements described in connection with one or more embodiments may be found in one embodiment, or may be found in more than one embodiment, or may be found in all embodiments, or may be found in no embodiments. Although one or more features and/or elements may be described herein in the context of only a single embodiment, or alternatively in the context of more than one embodiment, or further alternatively in the context of all embodiments, the features and/or elements may instead be provided separately or in any appropriate combination or not at all. Conversely, any features and/or elements described in the context of separate embodiments may alternatively be realized as existing together in the context of a single embodiment.

Any particular and all details set forth herein are used in the context of some embodiments and therefore should NOT be necessarily taken as limiting factors to the attached claims. The attached claims and their legal equivalents can be realized in the context of embodiments other than the ones used as illustrative examples in the description below.

Figure 2:
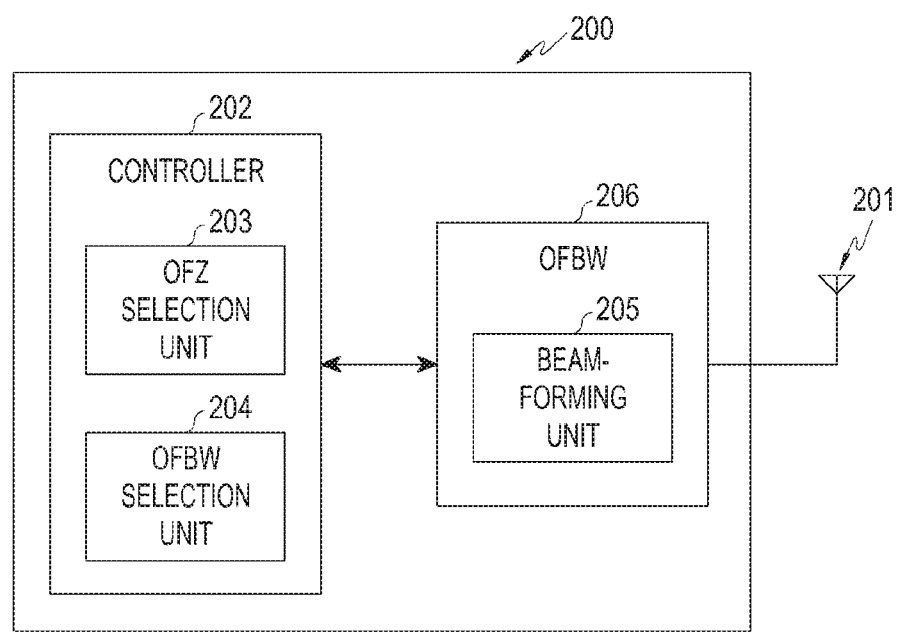
FIG. 2 illustrates device implementing the method for beam forming illustrated in FIG. 1, according to the embodiment of the present disclosure.

Referring to FIG. 1 and FIG. 2, a beam forming method 100 and a device 200 implementing the beam forming method for a transmitting antenna 201 are described. Examples of the transmitting antenna 201 can include, but not limited to, a beam antenna and an array antenna that can form one or more beams in a specific direction. The transmitting antenna 201 can be integral part of a user terminal such as smart phone, wearable devices, and a virtual reality (VR) device, a base station, vehicle, autonomous small size robot such as drones, and Internet of Things (IoT) devices such as wireless modems, smart TV, etc. As such, the device 200 can also be integral to the user terminal, the base station, the vehicle, the autonomous small size robot, and the IoT devices. The transmitting antenna 201 transmits the signal in a direction of a receiving antenna (not shown in the figure). The receiving antenna can be integral part of a user terminal such as smart phone, wearable devices, and a virtual reality (VR) device, a base station, vehicle, autonomous small size robot such as drones, and Internet of Things (IoT) devices such as wireless modems, smart TV, etc.

At step 101, at least one obstruction free zone and at least one obstruction free beam window are selected. The at least one obstruction free beam window (OFBW) is selected within said at least one obstruction free zone (OFZ). The OFZ is a zone or geographical area that has negligible obstruction(s) and consequently provides minimal propagation/path losses during transmission of signals. The obstruction(s) can be manmade obstruction(s) or natural obstruction(s). Examples of the obstruction include buildings/high-rise structures, trees, vehicles, rain, clouds, and a human body. The OFZ is selected in the direction of the receiving antenna.

To perform the selection of the at least one OFZ and the at least one OFBW, the device 200 includes a controller 202. The controller 202 further includes an OFZ selection unit 203 and an OFBW selection unit 204. The OFZ selection unit 203 selects the at least one OFZ and the OFBW selection unit 204 selects the at least one OFBW within the selected at least one OFZ.

At step 102, at least one beam is formed based on said at least one OFBW thus selected. As would be understood, beam forming is used to direct and steer an antenna's directivity beam in a particular direction. Beam window allows formation of beam that provides higher sensitivity in specific, desired directions, thereby allowing control over shape and steering of antenna's directivity pattern. Thus, formation of the at least one beam based on the selected OFBW generates a high directional and efficient beam with minimal losses and overheads.

To form the at least one beam at step 102, the device 200 includes a beam-forming unit 205. The beam-forming unit 205 forms at least one beam in accordance input, i.e., the at least one OFBW, provided by the controller 202. The beam-forming unit 205 can be included within a transmitting and receiving unit (TRU) 206. The transmitting and receiving unit 206 controls and performs a function of transmitting a signal to the receiving antenna through the at least one beam formed by the beam-forming unit 205. The transmitting antenna 201 then transmits the signal in the direction of the receiving antenna.

Further, during the formation of the at least one beam at step 102, the beam-forming unit 205 can employ various techniques as known in the art to form the beam. Examples of such techniques include analogue beam forming technique using a phase shifter, digital beam forming technique, hybrid beam forming technique, and physically moving the transmitting antenna to a previously defined direction. Examples of the digital beam forming technique include fixed beam forming technique, adaptive beam forming technique, azimuth beam forming technique, and elevation beam forming technique. Fixed beam forming technique is typically used when signal source location and noise source location is fixed with respect to the transmitting antenna 201. Examples of fixed beam forming technique include, but not limited to, Delay-and-Sum, Filter-and-Sum, and Weighted-Sum based technique. Adaptive beam forming technique is typically used when signal source location and noise source location are moving with respect to the transmitting antenna 201. Examples adaptive beam forming technique includes, but not limited to, Generalised Sidelobe Canceller (GSC), Linearly Constrained Minimum Variance (LCMV, Frost), In situ Calibrated Microphone Array (ICMA), and Minimum Mean Squared Error (MMSE).

Figure 3:
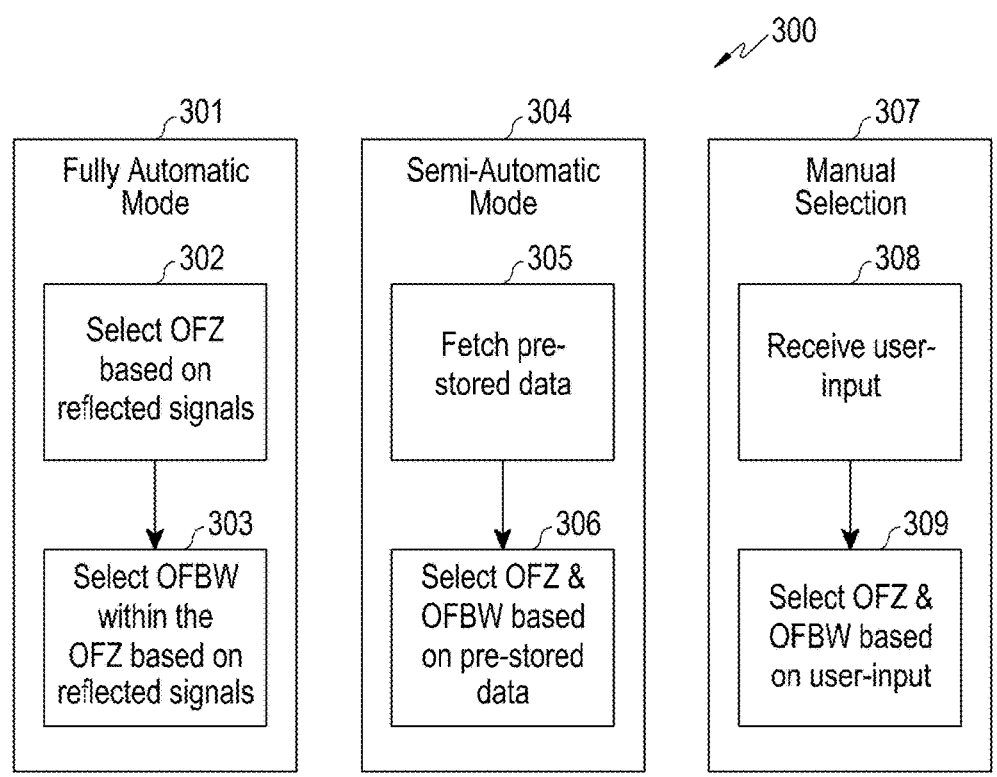
FIG. 3 illustrates a block diagram for beam forming, according to the embodiment of the present disclosure.
Figure 4:
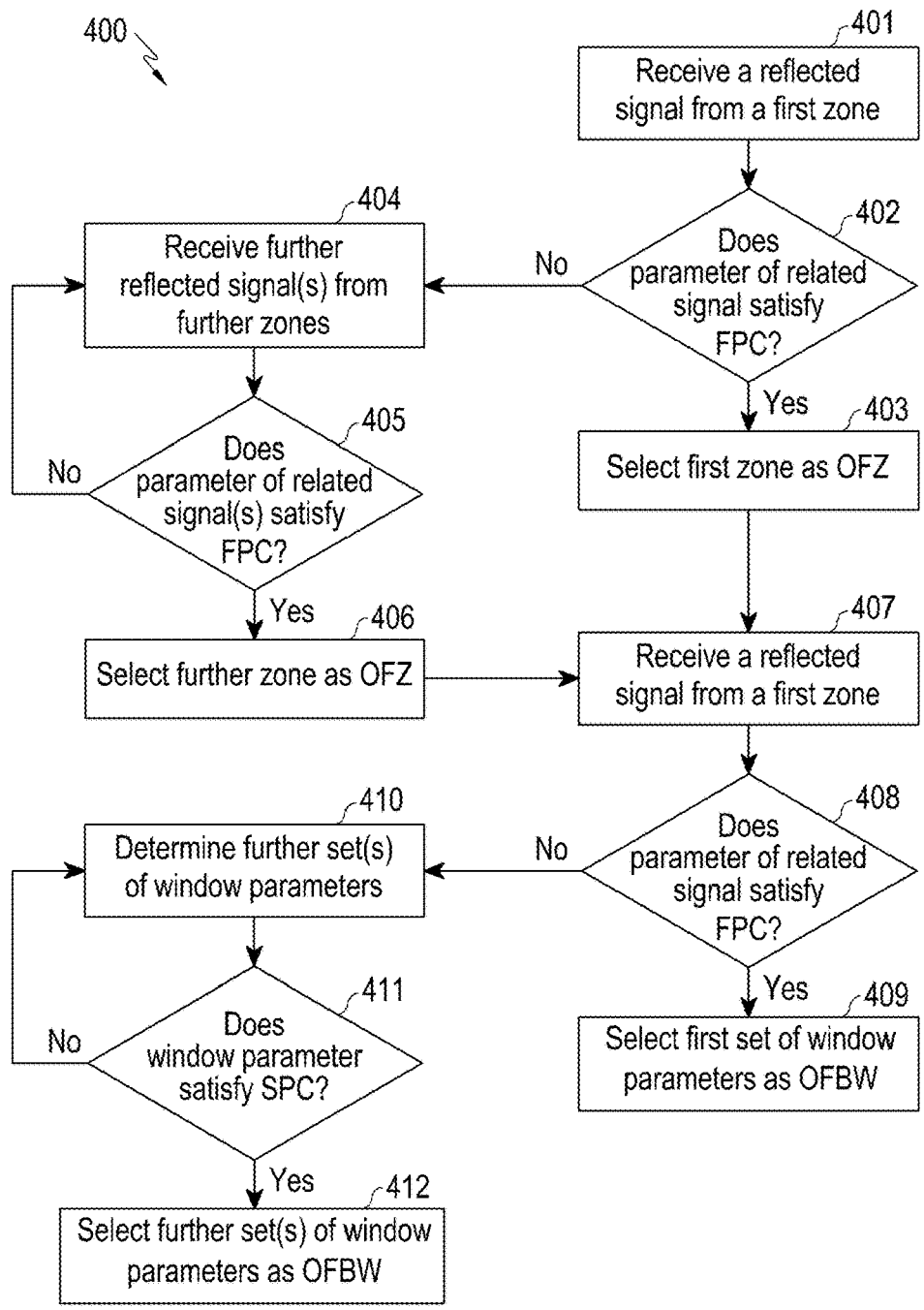
FIG. 4 illustrates a method for beam forming for a transmitting antenna illustrated in FIG. 3, according to one embodiment of the present disclosure.
Figure 5:
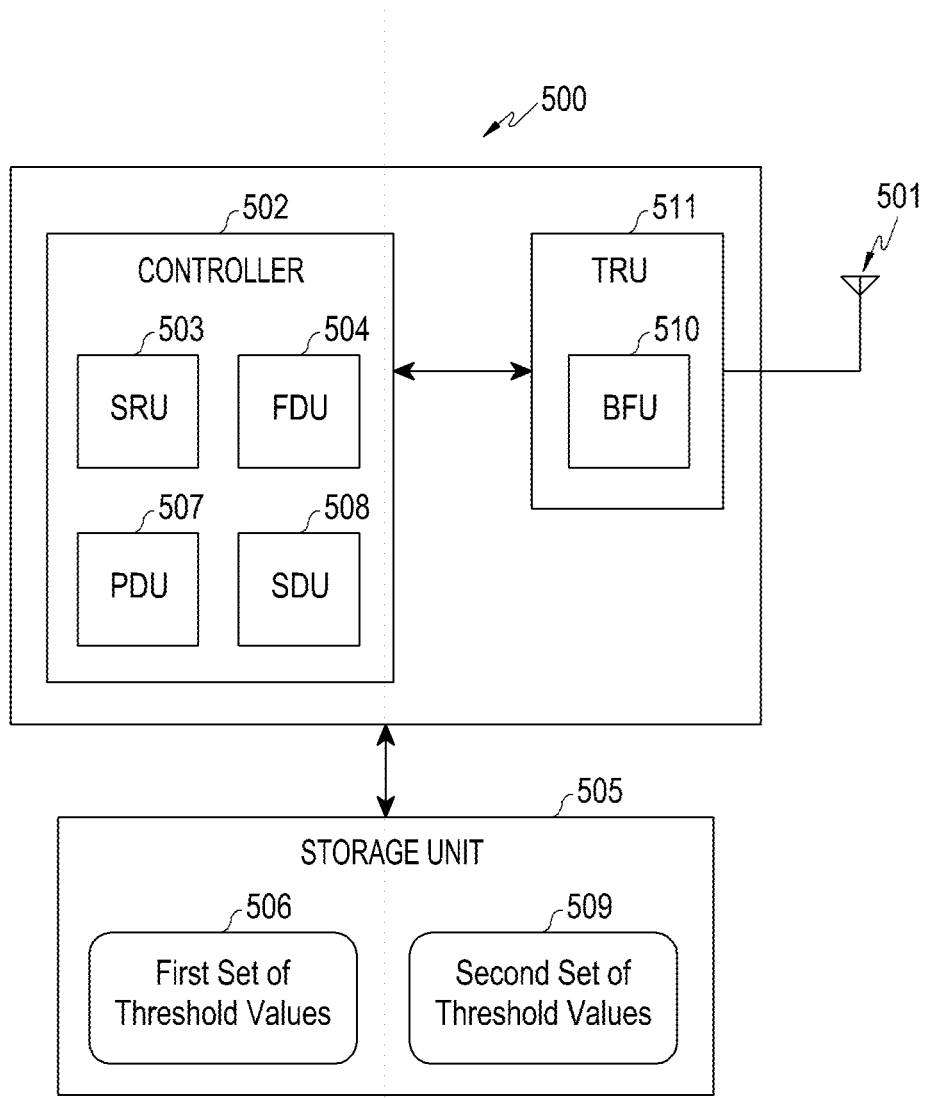
FIG. 5 illustrates device implementing the method for beam forming illustrated in FIG. 4, according to one embodiment of the present disclosure.

Referring to FIG. 1 again, in accordance with the disclosure, the selection of the at least one OFZ and the at least one OFBW, as defined at step 101, can be performed through various modes as illustrated in a block diagram 300 of FIG. 3.

In one implementation, as illustrated at block 301, the selection of the at least one OFZ and the at least one OFBW can be performed in fully automatic mode/manner. In this mode, the selection of the at least one OFZ and the at least one OFBW can be performed by scanning reflected signal(s). Thus, the at least one OFZ is selected by obtaining and processing reflected signal(s) as illustrated at block 302; and the at least one OFBW is selected by obtaining and processing reflected signal(s) within the selected at least one OFZ as illustrated at block 303.

In one implementation, as illustrated at block 304, the selection of the at least one OFZ and the at least one OFBW can be performed in semi-automatic mode/manner. In this mode, the selection of the at least one OFZ and the at least one OFBW can be performed based on pre-stored data. Thus, the pre-stored data is fetched as illustrated at block 305; and the selection of the at least one OFZ and the at least one OFBW is selected based on pre-stored data as illustrated at block 306.

In one implementation, as illustrated at block 307, the selection of the at least one OFZ and the at least one OFBW can be performed in manual mode/manner. In this mode, the selection of the at least one OFZ and the at least one OFBW can be performed based on user-input. Thus, the user-input is received as illustrated at block 308; and the selection of the at least one OFZ and the at least one OFBW is selected based on user-input as illustrated at step 309. The following paragraphs now describe each of the modes in detail.

Referring to FIG. 1 again, in accordance with the disclosure, the selection of the at least one OFZ and the at least one OFBW, as defined at step 101, can be performed through fully automatic mode as illustrated at block 301 of FIG. 3. Thus, referring to FIG. 4 and FIG. 5, a beam forming method 400 and a device 500 implementing the beam forming method for a transmitting antenna 501 are described below. Examples of the transmitting antenna 501 can include, but not limited to, a beam antenna and an array antenna that can form a beam in a specific direction. The transmitting antenna 501 can be integral part of a user terminal such as smart phone, wearable devices, and a virtual reality (VR) device, a base station, vehicle, autonomous small size robot such as drones, and Internet of Things (IoT) devices such as wireless modems, smart TV, etc. As such, the device 500 can also be integral to the user terminal, the base station, the vehicle, the autonomous small size robot, and the IoT devices. The transmitting antenna 501 transmits the signal in a direction of a receiving antenna (not shown in the figure). The receiving antenna can be integral part of a user terminal such as smart phone, wearable devices, and a virtual reality (VR) device, a base station, vehicle, autonomous small size robot such as drones, and Internet of Things (IoT) devices such as wireless modems, smart TV, etc.

In operation of the fully automatic mode, at step 401, a reflected signal is received from a first zone. In one example, the zone can be geographical area covered by a single cell. In one example, the zone can be a small geographical area within a current geographical area/location of the transmitting antenna 501.

To receive the reflected signal at step 401, the device 500 includes a controller 502. The controller 502 further includes a signal-receiving unit (SRU) 503. The SRU 503 can obtain the reflected signal using various techniques as known in the art. In one example, the SRU 503 obtains the reflected signals using Frequency-Modulated Continuous millimeter waves (FMCmmWV) radar technique. In one example, the SRU 503 obtains the reflected signals using photonic radar based techniques. In one example, the SRU 503 obtains the reflected signals using 3D scanning technique. In one example, the SRU 503 obtains the reflected signals using 2D scanning technique. In one example, the SRU 503 obtains the reflected signals by introducing phase shift in element(s) of the transmitting antenna 501.

At step 402, a determination is made if at least one parameter of the reflected signal satisfies a first set of predetermined conditions (referred as FPC in the figure for the sake of brevity). The at least one parameter of the reflected signal includes an intensity, angle of arrival (AOA), elevation angle, azimuth angle, frequency/Doppler shift, time of arrival (TOA), time difference of arrival (TDOA), power of the signal, signal to noise ratio, signal to interference plus noise ratio, interference, offset, coherent energy, incoherent energy, variance, correlation, and characteristics of at least one obstruction derived from the reflected signal. The characteristics include depth of the at least one obstruction, a width of the at least one obstruction, and a property of the at least one obstruction.

To process the received reflected signal at step 402, the controller 502 includes a first determination unit (FDU) 504. The FDU 504 obtains the at least one parameter of the received signal using techniques as known in the art. In one example, the FDU 504 obtains the at least one parameter of the received signal using Frequency-Modulated Continuous millimeter waves (FMCmmWV) radar technique. In one example, the FDU 504 obtains the at least one parameter of the received signal using 3D scanning technique. In one example, the FDU 504 obtains the at least one parameter of the received signal using 2D scanning technique. In one example, the FDU 504 obtains the at least one parameter of the received signal by introducing phase shift in element(s) of the transmitting antenna 501. In one example, the FDU 504 obtains the at least one parameter of the received signal by performing real-time sequential sampling of the reflected signal. In one example, the FDU 504 obtains the at least one parameter of the received signal using photonic radar based techniques.

Further, the FDU 504 derives the characteristics of the at least one obstruction, if any, present in the zone from where reflected signals are being received using techniques as known in the art. In one example, the FDU 504 derives the characteristics using 3D scanning technique. In one example, the FDU 504 derives the characteristics using 2D scanning technique.

Upon obtaining the at least one parameters, the FDU 504 determines if the at least one parameter satisfies the first set of predetermined conditions based on first set of predefined threshold values defined for the at least one parameter. The first set of predefined threshold values can be defined using techniques as known in the art. The first set of predetermined conditions includes at least one of:

a. comparing intensity of the reflected signal with a first predefined threshold value;
   b. comparing variance of the reflected signal with a first predefined threshold value;
   c. comparing frequency of the reflected signal with a first predefined threshold value;
   d. comparing time of arrival (TOA) of the reflected signal with a first predefined threshold value;
   e. comparing angle of arrival of the reflected signal with a first predefined threshold value;
   f. comparing power of the reflected signal with a first predefined threshold value;
   g. comparing signal to noise ratio with a first predefined threshold value;
   h. comparing signal to interference plus noise ratio with a first predefined threshold value; and
   i. comparing interference with a first predefined threshold value.

In one implementation, the first set of predefined threshold values, as indicated above, can be stored in a storage unit 505 as first set of threshold value(s) 506. It would be understood that the threshold value(s) might not be defined/set for all parameters. The threshold values may be added/updated/modified/ after the beam formation for subsequent evaluation/scanning.

Further, the storage unit 505 is communicatively coupled with the controller 502. In one implementation, the storage unit 505 can be internal to the device 500. In one example of such implementation, the device 500 and the storage unit 505 can be integral to a base station. In another implementation, the storage unit 505 can be external to the device 500. In one example of such implementation, the device 500 can be integral to a user terminal and the storage unit 505 can be associated with a network operator.

Upon determining the at least one parameter of the reflected signal satisfies first set of predetermined conditions at step 402, then at step 403 the first zone is selected as the obstruction free zone (OFZ). Accordingly, the FDU 504 compares a value of the at least one parameter with the predefined value(s) 506 and determines if the value is optimal with respect to the threshold value. In an implementation, the value is optimal if the value is lower than the predefined threshold value. In an implementation, the value is optimal if the value is higher than the predefined threshold value. Upon determining the value is optimal, the FDU 504 determines the first zone is having negligible obstruction(s) and consequently is capable of providing minimal propagation/path losses during transmission of signals. Accordingly, the FDU 504 selects the first zone as the OFZ. In an example, the FDU 504 selects a zone as OFZ when parameters of reflected signal satisfy below conditions:
  a. intensity of the reflected signal is lower than a first predefined threshold value;
  b. variance of the reflected signal is lower than a first predefined threshold value;
  c. frequency of the reflected signal is higher than a first predefined threshold value;
  d. time of arrival (TOA) of the reflected signal is higher than a first predefined threshold value;
  e. angle of arrival of the reflected signal is less than a first predefined threshold value;
  f. power of the reflected signal is lower than a first predefined threshold value;
  g. signal to noise ratio is lower than a first predefined threshold value;
  h. signal to interference plus noise ratio is lower than a first predefined threshold value; and
  i. interference is lower than a first predefined threshold value.

However, when the at least one parameter of the reflected signal does not satisfy the first set of predetermined conditions at step 402, then the process flows to step 404.

At step 404, one or more further reflected signals from one or more further zones are received. The further zones include the first zone. Accordingly, the SRU 503 receives the further reflected signal(s), in a manner as described above.

At step 405, a determination is made if at least one parameter of the one or more further reflected signals satisfy the first set of predetermined conditions.

At step 406, at least one further zone from the one or more further zones is selected as an obstruction free zone when the at least one parameter of the further reflected signal corresponding to the further zone satisfy the first set of predetermined conditions.

Accordingly, during steps 405 and 406, the FDU 504 compares a value of the at least one parameter of each of the reflected signals with the predefined value and determines if the value is optimal with respect to the threshold value, as described above at step 403. Upon determining the value is optimal, the FDU 504 determines the at least one further zone, from where the corresponding reflected signal is received, is having negligible obstruction(s) and consequently is capable of providing minimal propagation/path losses during transmission of signals. Accordingly, the FDU 504 selects the at least one further zone as the at least one OFZ.

Upon selection of the at least one OFZ either at step 403 or at step 406, the process flows to step 407 to select at least one obstruction free beam window within the at least one selected OFZ. Accordingly, at step 407, a first set of window parameters of a first beam window is determined based on the at least one parameter of a reflected beam corresponding to the selected obstruction free zone. The window parameters include a length of a beam window and a parameter controlling spectral characteristics of the beam window.

To process the reflected signal within the at least one selected OFZ at step 407, the controller 502 includes a parameter-determining unit (PDU) 507. Accordingly, the SRU 503 can select and provide the reflected signals corresponding to the first zone selected as the OFZ at step 403 to the PDU 507. The PDU 507 then determines the window parameters from the reflected signals using various techniques as known in the art. In one example, the PDU 507 determines the window parameters using Frequency-Modulated Continuous millimeter waves (FMCmmWV) radar technique. In one example, the PDU 507 determines the window parameters using photonic radar based techniques.

At step 408, a determination is made if the first set of window parameters satisfies second set of predetermined conditions (referred as SPC in the figure for the sake of brevity).

To process the window parameters within the at least one selected OFZ at step 409, the controller 502 includes a second determination unit (SDU) 508. The SDU 508 determines if the window parameters satisfies the second set of predetermined conditions based on second set of predefined threshold values defined for the window parameters. The second set of predefined threshold values can be defined using techniques as known in the art. The second set of predetermined conditions includes at least one of:
  a. comparing bandwidth of the reflected signal with a predefined threshold value;
  b. comparing intensity of the reflected signal with a second predefined threshold value;
  c. comparing frequency of the reflected signal with a second predefined threshold value; and
  d. comparing power of the reflected signal with a second predefined threshold value.

In one implementation, the second set of predefined threshold values, as indicated above, can be stored in the storage unit 505 as second set of threshold value(s) 509. It would be understood that the threshold value(s) might not be defined/set for all parameters. The threshold values may be added/updated/modified/ after the beam formation for subsequent evaluation/scanning.

Upon determining the first window parameters satisfies the second set of predetermined conditions at step 408, then at step 409 the first beam window is selected as the obstruction free beam window (OFBW). Accordingly, the SDU 508 compares a value of the window parameter (s) with the predefined threshold values 509 and determines if the value is optimal with respect to the threshold value. In an implementation, the value is optimal if the value is lower than the predefined threshold value. In an implementation, the value is optimal if the value is higher than the predefined threshold value. Upon determining the value is optimal, the SDU 508 determines the first set of window parameters is capable of generating high directional and efficient beam with minimal losses in the zone having negligible obstruction(s), i.e., the OFZ. Accordingly, the SDU 508 selects the first set of window parameters as the OFBW. In an example, the SDU 508 selects a set of window parameters as OFBW when window parameters satisfy below conditions:
  a. bandwidth of the reflected signal is lower than a predefined threshold value;
  b. intensity of the reflected signal is lower than a second predefined threshold value;
  c. frequency of the reflected signal is higher than a second predefined threshold value; and
  d. power of the reflected signal is lower than a second predefined threshold value.

However, when the first window parameters do not satisfy the second set of predetermined conditions at step 408, then the process flows to step 410 for determining further sets of window parameters.

At step 410, one or more further set of window parameters are determined based on the at least one parameter of one or more further reflected signals corresponding to the at least one selected OFZ. Accordingly, the SRU 503 selects and provides the reflected signals corresponding to the first zone and/or further zones selected as the OFZ at step 403 and/or step 406 to the PDU 507. The PDU 507 then determines the window parameters from each of the reflected signals using various techniques as known in the art.

At step 411, a determination is made if the at least one further set of window parameters satisfy the second set of predetermined conditions.

At step 412, the at least one further set of window parameters is selected as at least one obstruction free beam window.

Accordingly, during steps 411 and 412, the SDU 508 compares a value of the window parameters of each of the reflected signals with the predefined threshold values 509 and determines if the value is optimal with respect to the threshold value, as described above at step 409. Upon determining the value is optimal, the SDU 508 determines the further of window parameters is capable of generating high directional and efficient beam with minimal losses in the at least one zone having negligible obstruction(s), i.e., the OFZ. Accordingly, the SDU 508 selects the further set of window parameters as the OFBW.

Although, the first set of predetermined conditions and the second set of predetermined conditions have been described separately for selection of OFZ and OFBW, respectively, it may be understood that a single set of conditions can be predetermined that can be used for selection of OFZ and OFBW. The single set of conditions can be determined using techniques as known in the art.

Further, in one implementation, the SRU 503 and the FDU 504 can be part of an OFZ selection unit such as the OFZ selection unit 203 described in FIG. 2. In one implementation, a single unit such as the OFZ selection unit 203 as described in FIG. 2 can perform the functions of the SRU 503 and the FDU 504. In one implementation, the PDU 507 and the SDU 508 can be part of an OFBW selection unit such as the OFBW selection unit 204 described in FIG. 2. In one implementation, a single unit such as the OFBW selection unit 204 as described in FIG. 2 can perform the functions of the PDU 507 and the SDU 508. In one implementation, the controller 502 can perform the functions of the SRU 503, the FDU 504, the PDU 507, and the SDU 508.

Further, as described earlier in FIG. 2, the device 500 further includes a beam-forming unit (BFU) 510 within a transmitting and receiving unit (TRU) 511. The BFU 510 forms at least one beam based on the selected OFBW, i.e., the selected window parameters of beam window identified as the OFBW. The TRU 511 transmits a signal to the receiving antenna through the at least one beam formed by the BFU 510.

Further, in one implementation, selecting the OFBW based on reflected signals can be performed prior to transmitting signals to the receiving antenna. This enables transmission of data using high directional beam with minimal losses from beginning of the transmission. In another implementation, selecting the OFBW based on reflected signals can be performed during transmission of signals to the receiving antenna. Thus, the controller may keep processing the reflecting signals in the selected OFZ identify OFBW, especially when the location of the transmitting antenna 501 and/or the receiving antenna is changing. This reduces time in processing entire reflected signals from all zones.

Referring to FIG. 1 again, in accordance with the disclosure, the selection of the at least one OFZ and the at least one OFBW, as defined at step 101, can be performed through semi-automatic mode as illustrated at block 303 of FIG. 3. Thus, referring to FIGS. 6, 7, 8, and 9, and FIG. 10, a beam forming method 600, 700, 800, and 900, and a device 1000 implementing the beam forming method for a transmitting antenna 1001 are described below. Examples of the transmitting antenna 1001 can include, but not limited to, a beam antenna and an array antenna that can form one or more beams in a specific direction. The transmitting antenna 1001 can be integral part of a user terminal such as smart phone, wearable devices, and a virtual reality (VR) device, a base station, vehicle, autonomous small size robot such as drones, and Internet of Things (IoT) devices such as wireless modems, smart TV, etc. As such, the device 1000 can also be integral to the user terminal, the base station, the vehicle, the autonomous small size robot, and the IoT devices. The transmitting antenna 1001 transmits the signal in a direction of a receiving antenna (not shown in the figure). The receiving antenna can be integral part of a user terminal such as smart phone, wearable devices, and a virtual reality (VR) device, a base station, vehicle, autonomous small size robot such as drones, and Internet of Things (IoT) devices such as wireless modems, smart TV, etc.

Figure 6:
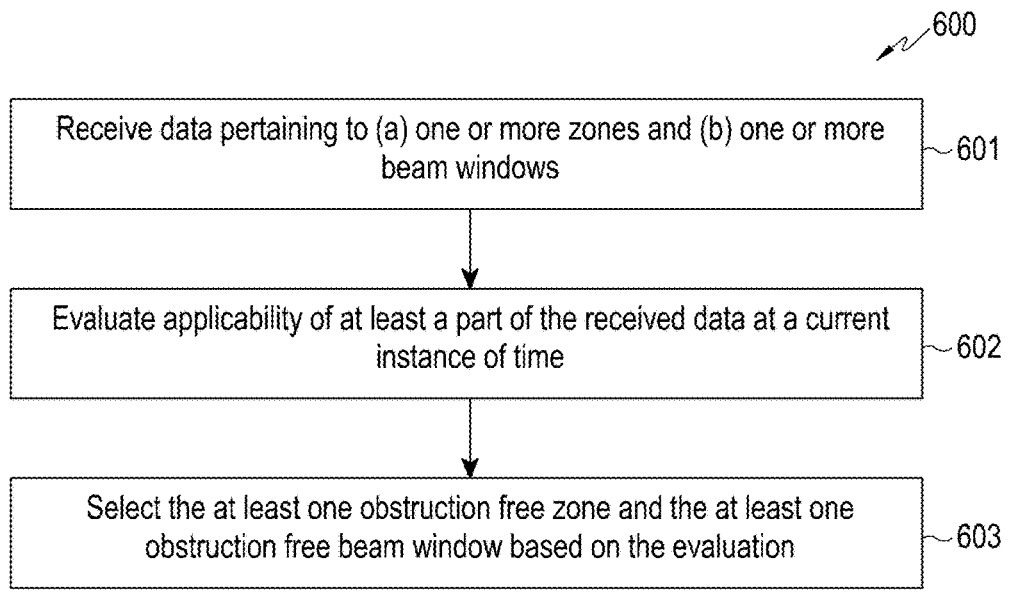
FIGS. 6, 7, 8, and 9 illustrate methods for beam forming for a transmitting antenna illustrated in FIG. 3, according to another embodiment of the present disclosure.

In operation of the semi-automatic mode, at step 601 of FIG. 6, data pertaining to (a) one or more zones and (b) one or more beam windows is received. Upon receiving the data at step 601, applicability of at least a part of the received data at a current instance of time is evaluated at step 602. At step 603, at least one obstruction free zone (OFZ) and at least one obstruction free beam window (OFBW) are selected based on the evaluation.

To receive and evaluate the data for selecting the OFZ and OFBW, the device 1000 includes a controller 1002. The controller further includes a data-receiving unit (DRU) 1003 to receive the data. The controller 1002 further includes an evaluating unit (EU) 1004 to process/evaluate the received data.

Figure 7:
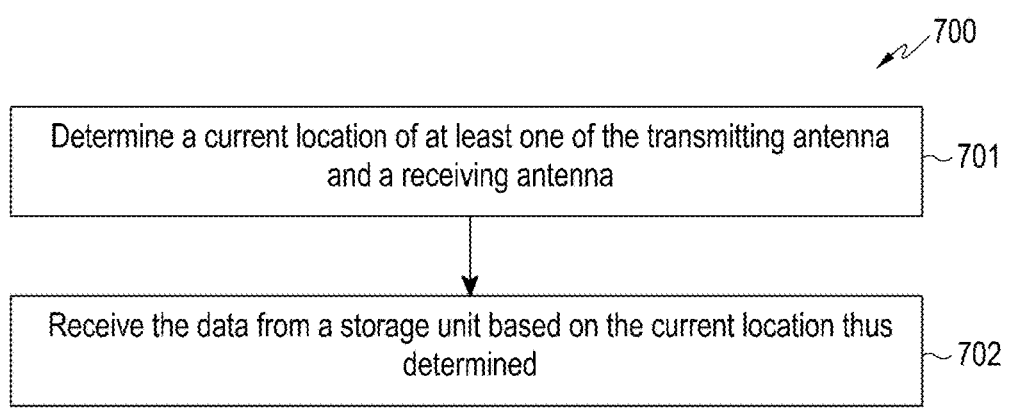

Referring to FIG. 6 again, in one implementation, the data at step 601 is received based on a current location of transmitter and receiver, and therefore the step 601 of receiving data can include further steps as illustrated in FIG. 7. At step 701 of FIG. 7, a current location of at least one of the transmitting antenna and the receiving antenna is obtained. At step 702, the data is received from a storage unit based on the current location thus determined.

To obtain the current location and consequently fetch the data, the DRU 1003 includes a location detection unit (LDU) 1005 and fetching unit (FU) 1006. The LDU 1005 detects the current location of the transmitting antenna 1001 using various techniques as known in the art. As described earlier, the device 1000 and the transmitting antenna 1001 can be an integral part of the user terminal, the base station, the vehicle, the autonomous small size robot, and the IoT devices. As such, the LDU 1005 can detect the current location of using techniques such as, but not limited to, inbuilt-global positioning system (GPS) sensor, GPS techniques, deriving geo-location from an IP address, an indoor position system (IPS), local positioning system (LPS), base station assisted (BS assisted) position determination technique, mobile station assisted (MS assisted) reverse position determination technique, etc. As would be understood, the IPS can be based on various technologies. Examples of such technologies include, but not limited to, Magnetic positioning, Inertial measurements, Wi-Fi-based positioning system (WPS), Bluetooth, Choke point concepts, Grid concepts, Long range sensor concepts, Angle of arrival, Time of arrival, and Received signal strength indication. The BS assisted position determination technique can use various signals such as a coordinated downlink (DL) positioning reference signal (PRS), a coordinated uplink (UL) sounding reference signal (SRS), etc. Similarly, the MS assisted position determination technique can use various techniques such as selectively crowd-sourced mobile position determination, explicit position assistance, or the like, and may use signals like DL PRS, UL SRS, etc.)

The LDU 1005 detects the current location of the receiving antenna using various techniques as known in the art. Similar to the transmitting antenna 1001, the receiving antenna can also be an integral part of the user terminal, the base station, the vehicle, the autonomous small size robot, and the IoT devices. In such case, the LDU 1005 can detect the current location using techniques such as, but not limited to, GPS, radar technique, sonar technique, GPS, a geo-fence, a near field communication (NFC), a location-sharing service, IPS, LPS, BS assisted position determination technique, MS assisted reverse position determination technique, etc. It would be understood, that determining location of the receiving antenna is not mandatory.

Upon detecting the current location, the FU 1006 fetches data pertaining to (a) one or more zones and (b) one or more beam windows 1008 (hereinafter referred to as data 1008) stored for the detected location from a storage unit 1007 coupled with the device 1000. The data received/fetched from the storage unit 1007 includes:
  a. information pertaining to geographic location of the one or more obstruction free zones;
  b. information pertaining to characteristics of at least one obstruction located in proximate to the geographic location;
  c. metadata associated with the one or more obstruction free zones prior to the current instance of time; the metadata includes values of one or more parameters associated with reflected signs(s) received in the one or more obstruction free zones;
  d. metadata associated with the one or more obstruction free beam windows prior to the current instance of time; the metadata includes values of one or more sets of window parameters corresponding to the one or more beam windows;
  e. ranking associated with the one or more obstruction free zones prior to the current instance of time; and
  f. ranking associated with the one or more obstruction free beam windows prior to the current instance of time.

Thus, the storage unit 1007 stores data pertaining to (a) one or more zones and (b) one or more beam windows that has been determined or evaluated or processed prior to the current instance of time. In addition, the data can be determined or evaluated or processed for various terminals/devices/systems used by various users and having the device 1000 prior to the current instance of time and stored in the storage unit 1007. This enables performing a combined evaluation of data for selecting most suitable OFZ and OFBW. In one implementation, the storage unit 1007 can be internal to the device 1000. In one example of such implementation, the device 1000 and the storage unit 1007 can be integral to a base station. In another implementation, the storage unit 1007 can be external to the device 1000. In one example of such implementation, the device 1000 can integral to a user terminal and the storage unit 1007 can associated with a network operator.

Figure 8:
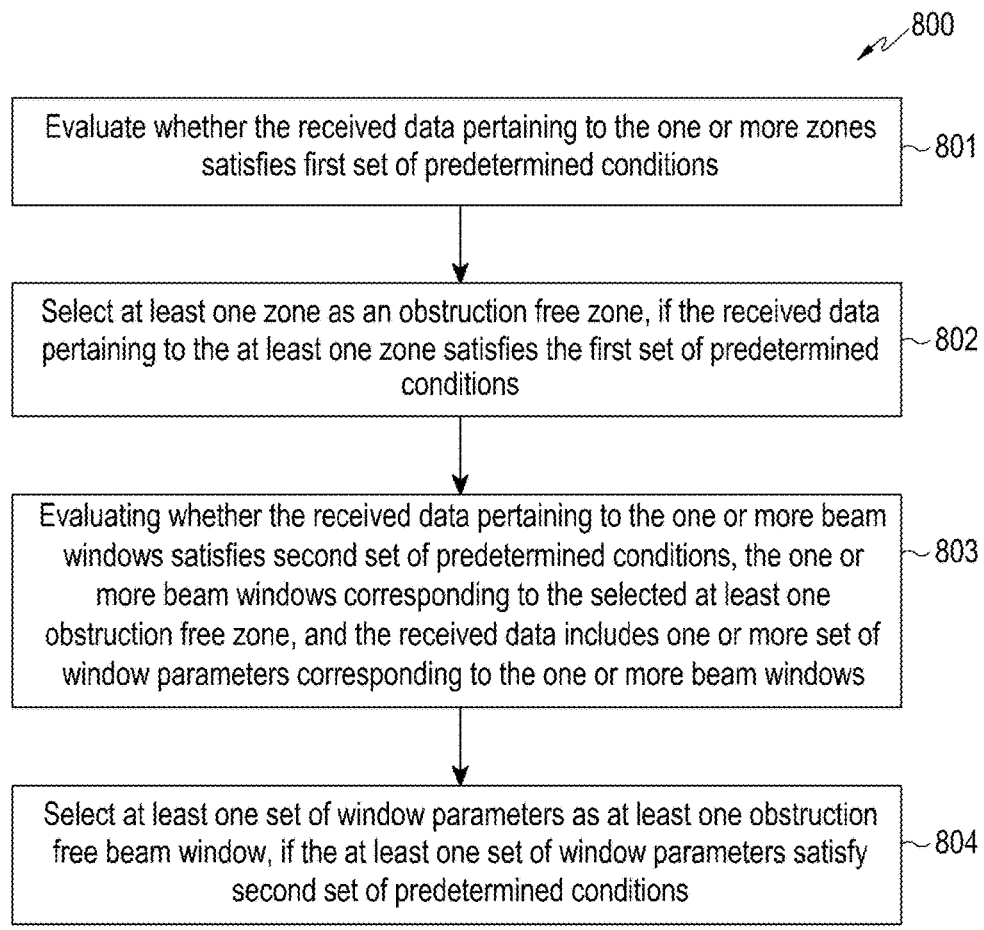
Figure 9:
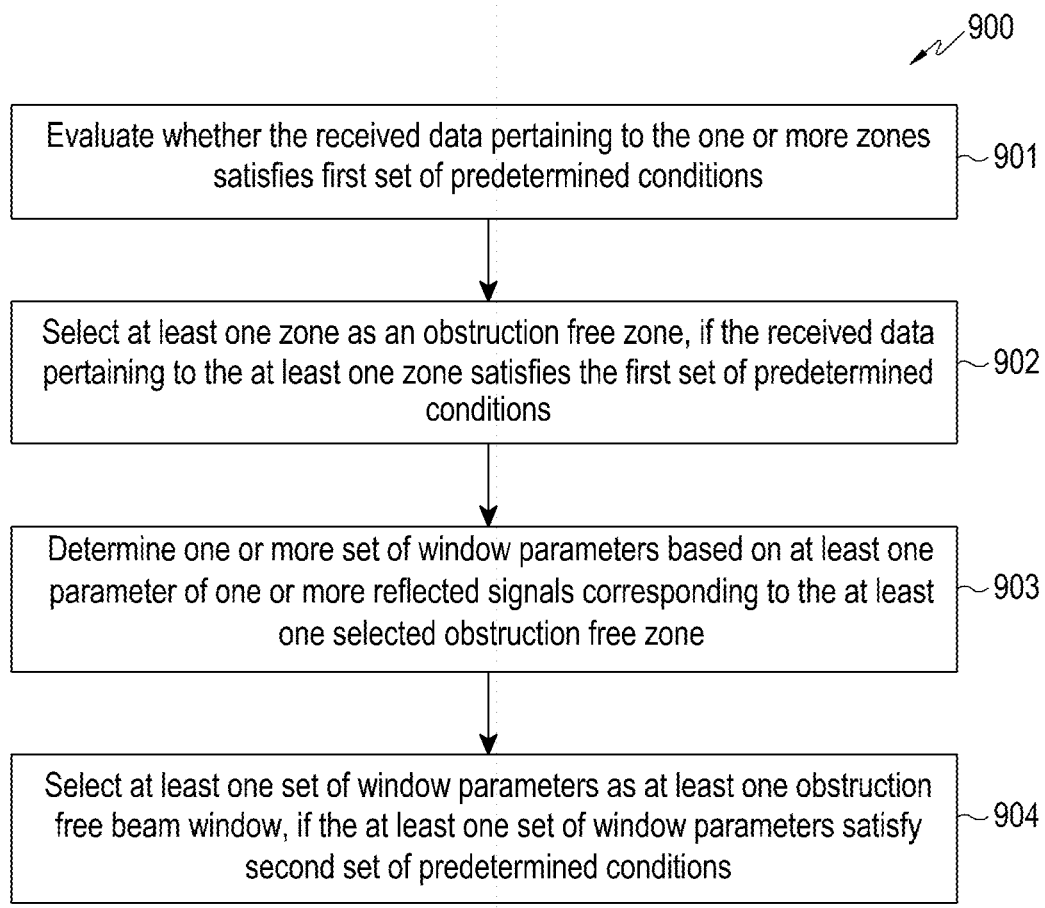
Figure 10:
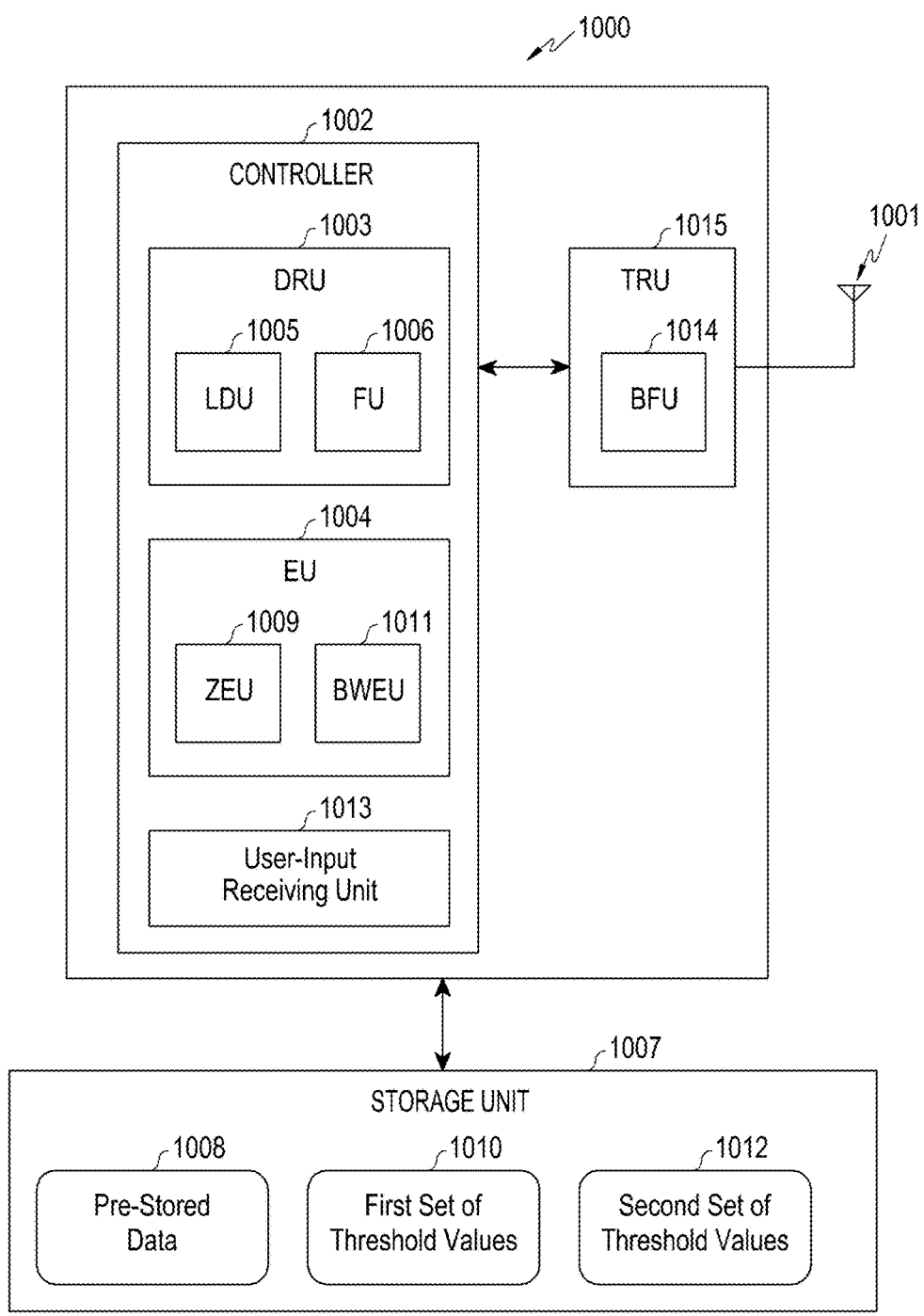
FIG. 10 illustrates device implementing the method for beam forming illustrated in FIGS. 6, 7, 8, and 9, according to another embodiment of the present disclosure.

Referring to FIG. 6 again, the evaluation and the selection performed at steps 602 and 603, respectively, can be performed in different ways as illustrated in FIG. 8 and FIG. 9.

Referring to FIG. 8, in one implementation, the data is evaluated to select both the OFZ and OFBW. At step 801 of FIG. 8, evaluation of the received data is performed to ascertain whether the received data pertaining to the one or more zones satisfies first set of predetermined conditions. At step 802, at least one zone is selected as an obstruction free zone, if the received data pertaining to the at least one zone satisfies the first set of predetermined conditions.

To evaluate the data for selecting OFZ at steps 801 and 802, the EU 1004 includes zone evaluation unit (ZEU) 1009. In one implementation, the ZEU 1009 obtains a value of parameters associated with reflected signs(s) received in the one or more zones from the received data 1008. Upon obtaining the values of parameters, the ZEU 1009 determines if the parameters satisfies the first set of predetermined conditions as described in step 402 and 405 above. Accordingly, the ZEU 1009 fetches first set of predefined threshold values 1010 stored in the storage unit 1007. Upon fetching, the ZEU 1009 compares a value of the parameters with the predefined value(s) 1010 and determines if the value is optimal with respect to the threshold value. In an implementation, the value is optimal if the value is lower than the predefined threshold value. In an implementation, the value is optimal if the value is higher than the predefined threshold value. Upon determining the value is optimal, the ZEU 1009 selects the at least one zone with parameters having optimal value as the OFZ.

In one implementation, the ZEU 1009 may utilize a localized zone selection model to select at least one OFZ corresponding to the current location. The localized zone selection model may be a machine-learning model that is trained to interpret the received data and determine most suitable zone(s), which can satisfy the first predetermined conditions to be selected as OFZ. Any suitable machine learning model may be used for a trained localized zone selection model including, without limitation, an artificial neural network, a hidden Markov model (HMM), a Kalman filter (or enhanced Kalman filter), a Bayesian network (or Bayesian belief network), a support vector machine (SVM), a decision tree, etc.

Upon selecting the OFZ, the data is further evaluated to select the OFBW. Referring to FIG. 8 again, at step 803, evaluation of the received data is performed to ascertain whether the received data pertaining to the one or more beam windows satisfies second set of predetermined conditions. The one or more beam windows correspond to the selected at least one obstruction free zone. At step 804, at least one set of window parameters is selected as at least one obstruction free beam window, if the at least one set of window parameters satisfy second set of predetermined conditions.

To evaluate the data for selecting OFBW at steps 803 and 804, the EU 1004 includes beam window evaluation unit (BWEU) 1011. In one implementation, the BWEU 1011 obtains a value of window parameters determined previously for the selected zone from the received data 1008. Upon obtaining the values of window parameters, the BWEU 1011 determines if the parameters satisfies the second set of predetermined conditions as described in step 408 and 411 above. Accordingly, the BWEU 1011 fetches second set of predefined threshold values 1012 stored in the storage unit 1007. Upon fetching, the BWEU 1011 compares a value of the parameters with the predefined value(s) 1012 and determines if the value is optimal with respect to the threshold value. In an implementation, the value is optimal if the value is lower than the predefined threshold value. In an implementation, the value is optimal if the value is higher than the predefined threshold value. Upon determining the value is optimal, the BWEU 1011 selects the at least one window parameters having optimal values as the OFBW.

In one implementation, the BWEU 1011 may utilize a localized window selection model to select at least one OFBW corresponding to the selected OFZ. The localized window selection model may be a machine-learning model that is trained to interpret the received data and determine most suitable window parameters, which can satisfy the second predetermined conditions to be selected as OFBW. Any suitable machine learning model may be used for a trained localized window selection model including, without limitation, an artificial neural network, a hidden Markov model (HMM), a Kalman filter (or enhanced Kalman filter), a Bayesian network (or Bayesian belief network), a support vector machine (SVM), a decision tree, etc.

In one implementation, the BWEU 1011 may select at least one POFZ based on a terminal feedback received from the receiving antenna. In one such implementation, the BWEU 1011 may transmit at least one pilot signal through the transmitting antenna 1001 to the receiving antenna. Upon receiving the at least one pilot signal, the receiving antenna may transmit a feedback indicating window parameters that are most suitable for receiving beam(s) from a transmitting antenna. In another such implementation, the receiving antenna can periodically transmit the feedback, without receiving any pilot signal. Based on the received feedback, the BWEU 1011 selects the window parameters from the received data as the OFBW. Referring to FIG. 9, in another implementation, the data is evaluated to select only the OFZ and the OFBW is determined based from reflected signals received from the selected OFZ. At step 901 of FIG. 9, evaluation of the received data is performed to ascertain whether the received data pertaining to the one or more zones satisfies first set of predetermined conditions. At step 902, at least one zone is selected as an obstruction free zone, if the received data pertaining to the at least one zone satisfies the first set of predetermined conditions. As described earlier with reference to step 801, the ZEU 1009 obtains a value of parameters associated with reflected signs(s) received in the one or more zones from the received data 1008. Thereafter, as described earlier with reference to step 801 802, the ZEU 1009 selects the at least one zone with parameters having optimal value as the OFZ based on a comparison with the first set of threshold values 1010.

Upon selecting the OFZ, the OFBW is determined based from reflected signals received from the selected OFZ. Referring to FIG. 9 again, at step 903, one or more set of window parameters are determined based on at least one parameter of one or more reflected signals corresponding to the at least one zone selected as OFZ. At step 904, at least one set of window parameters is selected as the OFBW, if the at least one set of window parameters satisfy second set of predetermined conditions.

Accordingly, the BWEU 1011 obtains the reflected signal from the at least one zone selected as OFZ using various techniques as known in the art. The BWEU 1011 then determines the window parameters from the reflected signals using various techniques as known in the art. The window parameters include a length of a beam window and a parameter controlling spectral characteristics of the beam window, as described earlier. Thereafter, the BWEU 1011 determines if the parameters satisfies the second set of predetermined conditions as described in steps 408 and 411 above and at step 804. Accordingly, the BWEU 1011 selects the at least one set of window parameters having optimal value as the OFBW based on the second set of threshold values 1012. In one implementation, the BWEU 1011 can include various units such as the SRU 503, the PDU 507 and the SDU 508, as described in FIG. 5 to perform the various functions as described above.

Further, the selection of the OFZ at steps 802 and 902, and the selection of OFBW at steps 804 and 904 are based on user-input in addition to said evaluation. Accordingly, the controller 1002 includes a user-input receiving unit 1013 for receiving the user-input. The user-input is received via an input unit communicative coupled with the user terminal, the base station, the vehicle, and the autonomous small size robot of which the device 1000 is the integral part, as described earlier.

Further, in one implementation, the ZEU 1009 can be part of an OFZ selection unit such as the OFZ selection unit 203 described in FIG. 2. In one implementation, the BWEU 1011 can be part of an OFBW selection unit such as the OFBW selection unit 204 described in FIG. 2. In one implementation, the EU 1004 can perform the functions of the ZEU 1009 and the BWEU 1011. In one implementation, the EU 1004 can perform the functions of the ZEU 1009, the BWEU 1011, and the user-input receiving unit 1013. In one implementation, the controller 1002 can perform the functions of the ZEU 1009 and the BWEU 1011. In one implementation, the controller 1002 can perform the functions of the ZEU 1009, the BWEU 1011, and the user-input receiving unit 1013. In one implementation, the controller 1002 can perform the functions of the DRU 1003, the ZEU 1009, and the BWEU 1011. In one implementation, the controller 1002 can perform the functions of the DRU 1003, the ZEU 1009, the BWEU 1011, and the user-input receiving unit 1013.

Further, as described earlier in FIG. 2, the device 1000 further includes a beam-forming unit (BFU) 1014 within a transmitting and receiving unit (TRU) 1015. The BFU 1014 forms at least one beam based on the selected OFBW, i.e., the selected window parameters of beam window identified as the OFBW. The TRU 1015 transmits a signal to the receiving antenna through the at least one beam formed by the BFU 1014.

Referring to FIG. 1 again, in accordance with the disclosure, the selection of the at least one OFZ and the at least one OFBW, as defined at step 101, can be performed through manual mode as illustrated at block 306 of FIG. 3. Thus, referring to FIGS. 11 and 12, and FIG. 13, a beam forming method 1100 and 1200, and a device 1300 implementing the beam forming method for a transmitting antenna 1301 are described below. Examples of the transmitting antenna 1301 can include, but not limited to, a beam antenna and an array antenna that can form one or more beams in a specific direction. The transmitting antenna 1301 can be integral part of a user terminal such as smart phone, wearable devices, and a virtual reality (VR) device, a base station, vehicle, autonomous small size robot such as drones, and Internet of Things (IoT) devices such as wireless modems, smart TV, etc. As such, the device 1300 can also be integral to the user terminal, the base station, the vehicle, the autonomous small size robot, and the IoT devices. The transmitting antenna 1301 transmits the signal in a direction of a receiving antenna (not shown in the figure). The receiving antenna can be integral part of a user terminal such as smart phone, wearable devices, and a virtual reality (VR) device, a base station, vehicle, autonomous small size robot such as drones, and Internet of Things (IoT) devices such as wireless modems, smart TV, etc.

Figure 11:
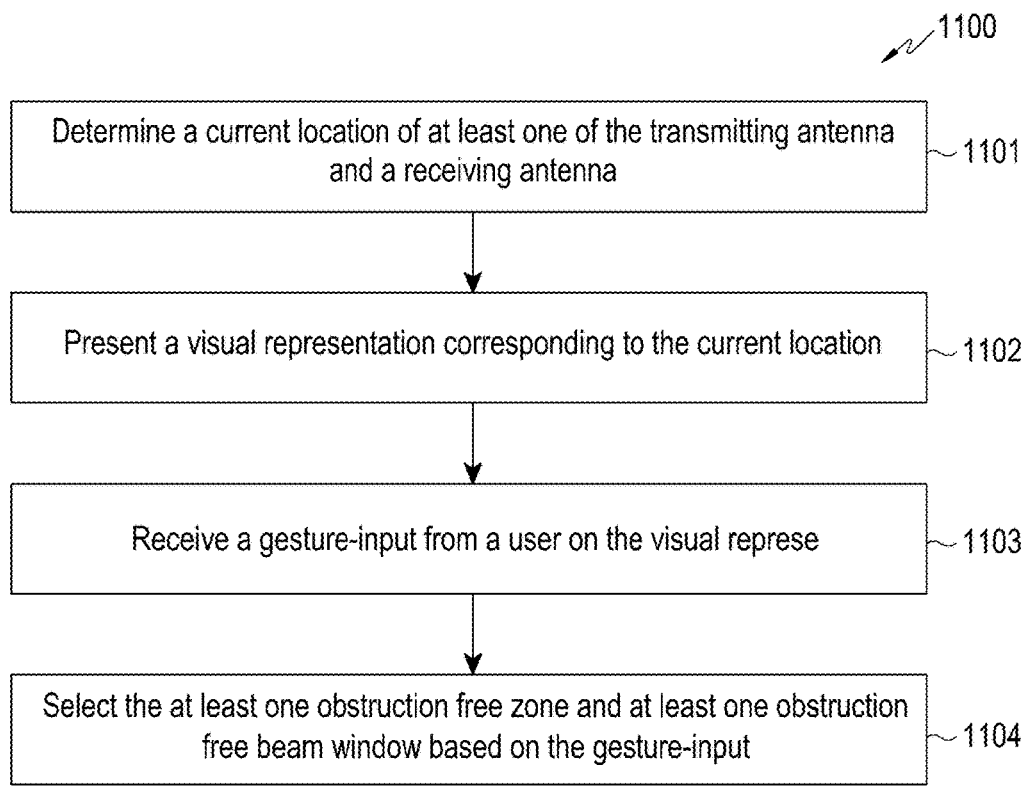
FIGS. 11 and 12 illustrate methods for beam forming for a transmitting antenna illustrated in FIG. 3, according to yet another embodiment of the present disclosure.

In operation of the manual mode, at step 1101 of FIG. 11, a current location of at least one of the transmitting antenna and the receiving antenna is determined. At step 1102, a visual representation corresponding to the current location is presented. The visual representation includes at least one of a plurality of zones and plurality of obstructions present at the current location.

To detect current location and present a corresponding visual representation during steps 1101 and 1102, the device 1300 includes a controller 1302. The controller 1302 further includes a location detection unit (LDU) 1303 and a representation unit (RU) 1304. The LDU 1303 detects the current location of the transmitting antenna 1301 using various techniques as known in the art and as described earlier. The LDU 1303 detects the current location of the receiving antenna using various techniques as known in the art and as described earlier.

Based on the detected current location, the RU 1304 fetches a visual representation of the current location. Examples of the visual representation include, but not limited to, a pictorial representation, 2D map such as political map, physical map, and street map, and 3D map, a satellite based map/image, etc. The visual representation includes a plurality of zones or small geographical areas corresponding to the current location. In addition, the visual representation includes plurality of obstructions present at the current location. Additionally, the visual representation may indicate a current location of the transmitting antenna 1301

In one example, the visual representation is fetched from a plurality of visual representations 1305 stored in a storage unit 1306 coupled with the device 1300. The plurality of visual representations 1305 may be updated periodically in a manner as known in the art. In one implementation, the storage unit 1306 can be internal to the device 1300. In one example of such implementation, the device 1300 and the storage unit 1306 can be integral to a base station. In another implementation, the storage unit 1306 can be external to the device 1300. In one example of such implementation, the device 1300 can integral to a user terminal and the storage unit 1306 can be associated with any other terminal such as network operator and a server. In another example, the RU 1304 fetches the visual representation directly from a server(s) hosting services that provide the visual representations.

Upon fetching the visual representation, the RU 1304 presents/displays the visual representation on a display unit 1307 communicatively coupled to the device 1300. As with the device 1300, the display unit 1307 can be integral part of a user terminal such as smart phone and a virtual reality (VR) device, a base station, vehicle, autonomous small size robot such as drones.

Referring to FIG. 11 again, upon presenting the visual representation, at step 1103, a gesture-input from a user is received on the visual representation. Accordingly, the controller 1302 includes a user-input receiving unit 1308 for receiving the user-input. The user-input is received via an input unit communicatively coupled with the user terminal, the base station, the vehicle, and the autonomous small size robot of which the device 1300 is the integral part, as described earlier.

At step 1104, the at least one obstruction free zone and at least one obstruction free beam window is selected based on the gesture-input. Accordingly, the controller 1302 includes a selection unit (SU) 1309 for selecting the obstruction free zone and the obstruction free beam window based on the gesture-input. The step 1104 can be performed in a manner as illustrated in FIG. 12.

Figure 12:
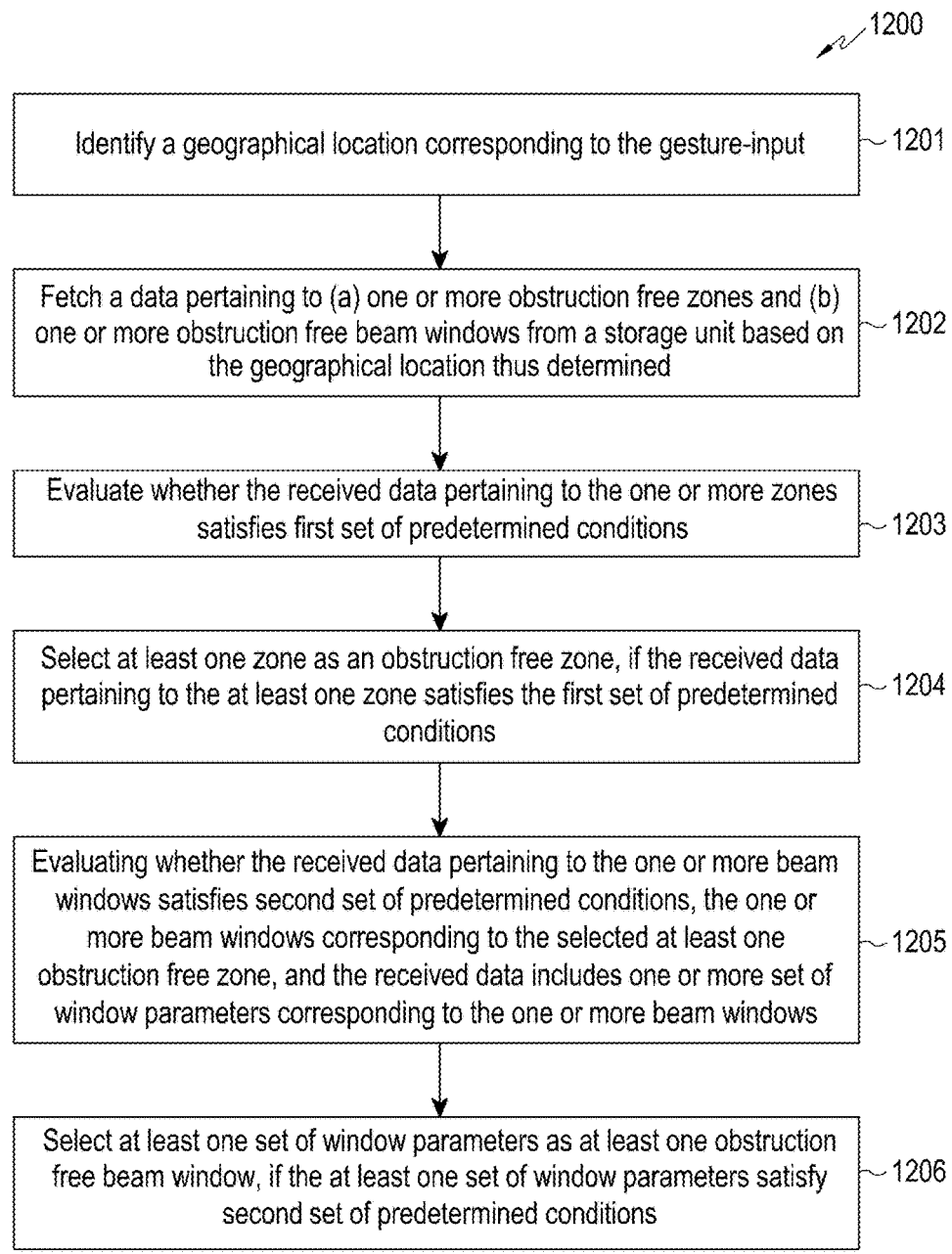
Figure 13:
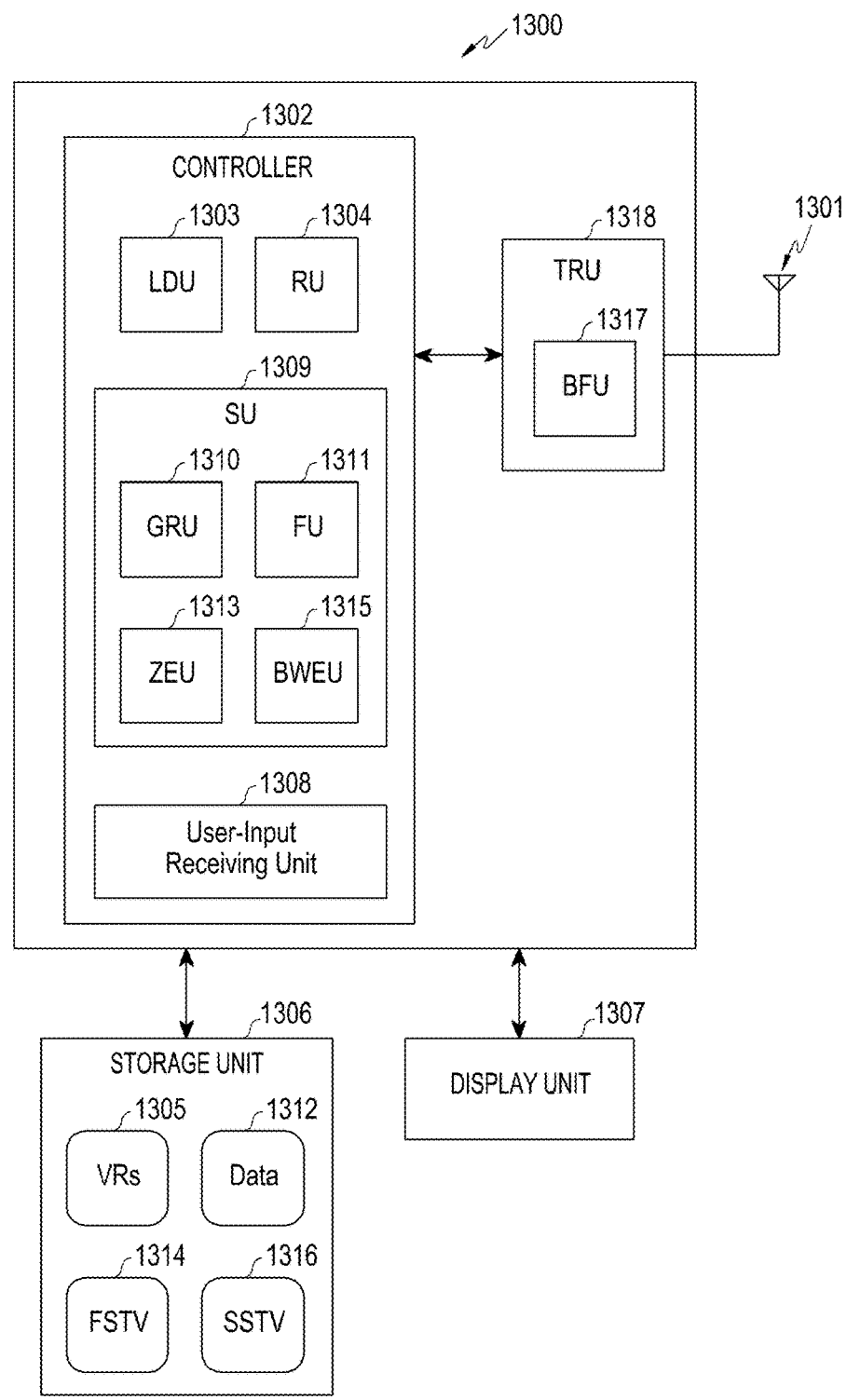
FIG. 13 illustrates device implementing the method for beam forming illustrated in FIGS. 6, 7, 8, and 9, according to another embodiment of the present disclosure.
Figure 14:
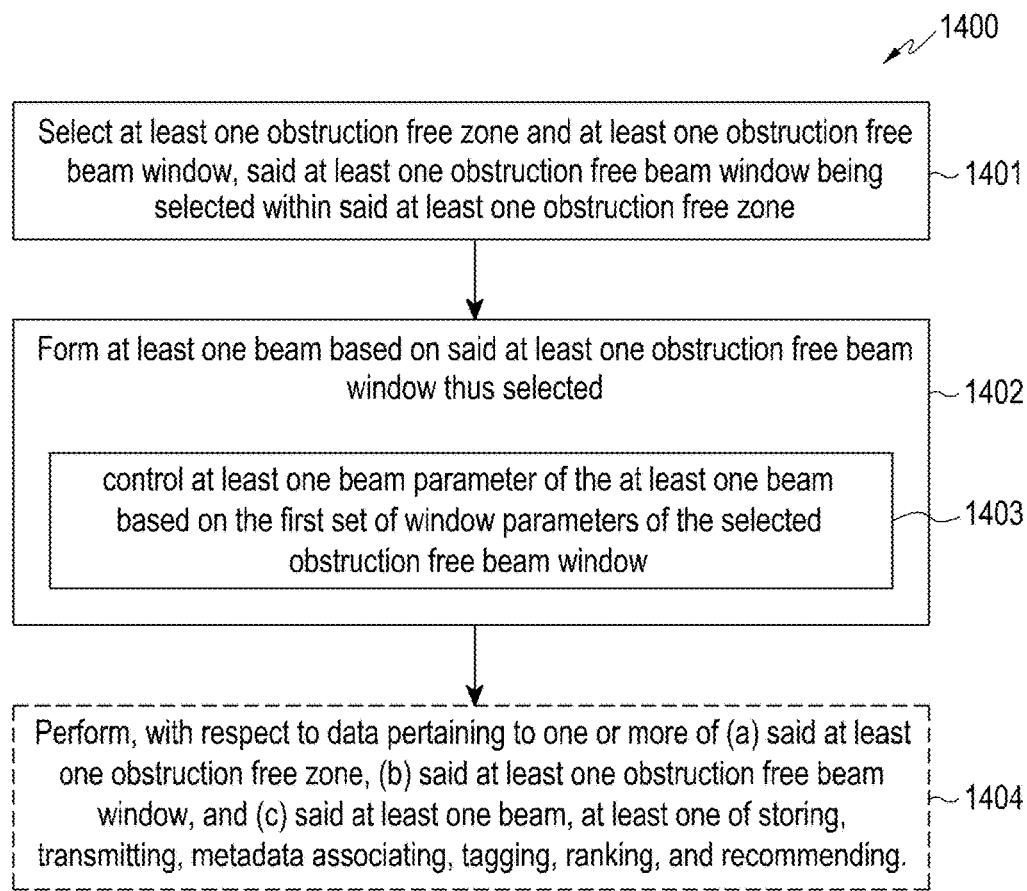
FIG. 14 illustrates a method for beam forming for a transmitting antenna, according to still another embodiment of the present disclosure.
Figure 15:
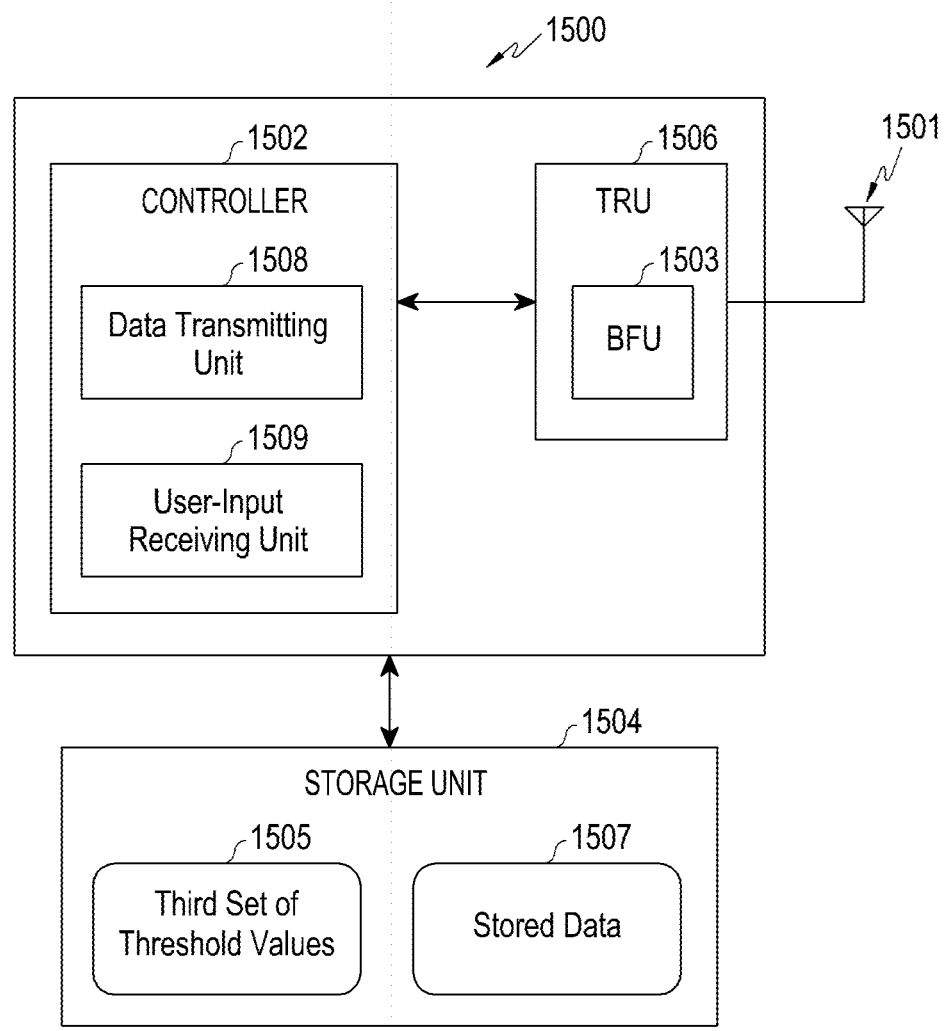
FIG. 15 illustrates device implementing the method for beam forming illustrated in FIG. 14, according to still another embodiment of the present disclosure.

Referring to FIG. 12, at step 1201 a geographical location corresponding to the gesture-input is identified. At step 1202, a data pertaining to (a) one or more obstruction free zones and (b) one or more obstruction free beam windows are fetched from a storage unit based on the geographical location thus determined.

Accordingly, the SU 1309 includes a gesture-recognition unit (GRU) 1310 and a fetching unit (FU) 1311. Upon receiving the gesture input, the GRU 1310 determines at least one gesture parameter corresponding to the gesture input. The at least one parameter is selected from a group comprising of: shape of the gesture input, size of the gesture input, and direction associated with the gesture input. The shape and size of the gesture input enable identification of an area corresponding to the geographical location. The direction associated with the gesture input enables estimation of a beam direction in which beam is to be formed.

Upon detecting the location, the FU 1311 fetches data pertaining to (a) one or more zones and (b) one or more beam windows 1312 (hereinafter referred to as data 1312) stored for the detected location from the storage unit 1306. As described earlier at step 702, the data 1312 received/fetched from the storage unit 1306 is determined or evaluated or processed prior to a current instance of time at which the current location is identified.

In addition, to aid the user in selecting location via the gesture input, the RU 1304 may indicate or highlight some portions on the visual representation based on the data 1312. In one implementation, the RU 1304 may indicate characteristics of the plurality of obstructions on the visual representation. In one implementation, the RU 1304 may indicate one or more obstruction free zones (OFZ) corresponding to the current location on the visual representation. In one implementation, the RU 1304 may indicate at least one parameter of at least one reflected signal received from the one or more obstruction free zones. In one implementation, the RU 1304 may indicate one or more set of window parameters corresponding to one or more obstruction free beam windows on the visual representation. The RU 1304 may indicate or highlight the characteristic/OFZ/parameter of reflected signal/window parameters using mechanisms as known in the art.

Further, upon receiving the data 1312, the data 1312 is evaluated to select both the OFZ and OFBW. At step 1203, evaluation of the received data is performed to ascertain whether the received data pertaining to the one or more zones satisfies first set of predetermined conditions. At step 1204, at least one zone is selected as an obstruction free zone, if the received data pertaining to the at least one zone satisfies the first set of predetermined conditions.

To evaluate the data for selecting OFZ at steps 1203 and 1204, the SU 1309 includes zone evaluation unit (ZEU) 1313. The ZEU 1313 obtains a value of parameters associated with reflected signs(s) received in the one or more zones from the received data 1312. Upon obtaining the values of parameters, the ZEU 1313 determines if the parameters satisfies the first set of predetermined conditions as described in step 402 and 405 above. Accordingly, the ZEU 1313 fetches first set of predefined threshold values (FSTV) 1314 stored in the storage unit 1306. Upon fetching, the ZEU 1313 compares a value of the parameters with the predefined value(s) 1314 and determines if the value is optimal with respect to the threshold value. In an implementation, the value is optimal if the value is lower than the predefined threshold value. In an implementation, the value is optimal if the value is higher than the predefined threshold value. Upon determining the value is optimal, the ZEU 1313 selects the at least one zone with parameters having optimal value as the OFZ.

Upon selecting the OFZ, the data 1312 is further evaluated to select the OFBW. At step 1205, evaluation of the received data is performed to ascertain whether the received data pertaining to the one or more beam windows satisfies second set of predetermined conditions. The one or more beam windows correspond to the selected at least one obstruction free zone. At step 1206, at least one set of window parameters is selected as at least one obstruction free beam window, if the at least one set of window parameters satisfy second set of predetermined conditions.

To evaluate the data for selecting OFBW at steps 1205 and 1206, the SU 1309 includes beam window evaluation unit (BWEU) 1315. The BWEU 1315 obtains a value of window parameters determined previously for the selected zone from the received data 1312. Upon obtaining the values of window parameters, the BWEU 1315 determines if the parameters satisfies the second set of predetermined conditions as described in step 408 and 411 above. Accordingly, the BWEU 1315 fetches second set of predefined threshold values (SSTV) 1316 stored in the storage unit 1306. Upon fetching, the BWEU 1315 compares a value of the parameters with the predefined value(s) 1316 and determines if the value is optimal with respect to the threshold value. In an implementation, the value is optimal if the value is lower than the predefined threshold value. In an implementation, the value is optimal if the value is higher than the predefined threshold value. Upon determining the value is optimal, the BWEU 1315 selects the at least one window parameters having optimal values as the OFBW.

Further, in one implementation, the ZEU 1313 can be part of an OFZ selection unit such as the OFZ selection unit 203 described in FIG. 2. In one implementation, the BWEU 1315 can be part of an OFBW selection unit such as the OFBW selection unit 204 described in FIG. 2. In one implementation, the SU 1309 can perform the functions of the ZEU 1313 and the BWEU 1315. In one implementation, the SU 1309 can perform the functions of the GRU 1310, the FU 1311, the ZEU 1313, and the BWEU 1315. In one implementation, the controller 1302 can perform the functions of the ZEU 1313 and the BWEU 1315. In one implementation, the controller 1302 can perform the functions of the SU 1309. In one implementation, the controller 1302 can perform the functions of the LDU 1303, the RU 1304, and the SU 1309.

Further, as described earlier in FIG. 2, the device 1300 further includes a beam-forming unit (BFU) 1317 within a transmitting and receiving unit (TRU) 1318. The BFU 1317 forms at least one beam based on the selected OFBW, i.e., the selected window parameters of beam window identified as the OFBW. The TRU 1318 transmits a signal to the receiving antenna through the at least one beam formed by the BFU 1317.

Further, the above-described modes of operation for selection of OFZ and OFBW i.e., the fully automatic mode, the semi-automatic mode, and the manual mode, can be selected as per need and requirement to transmit and receive signals/data. In one implementation, the mode of operation is a static selection. In one example, the mode of operation is pre-selected as a default option during manufacturing of the user terminal, the base station, the vehicle, the autonomous small size robot, and the IoT device. In one example, the mode of operation is selected based on a user-input during operation of the user terminal, the base station, the vehicle, the autonomous small size robot, and the IoT device.

In one implementation, the mode of operation is dynamically selected at a current instance of time. In such implementation, the default selected mode or the user-input selected mode may be over-ridden. In one example, the mode of operation is dynamically selected based on movement of the user terminal, the vehicle, the autonomous small size robot, and the IoT device. In one example, the mode of operation is dynamically selected based on periodic activity.

In one example, the mode of operation is dynamically selected based on presence of mobile/dynamic obstructions in the zones.

Referring to FIG. 1, FIG. 3, FIG. 4, FIGS. 6-9, and FIGS. 11 to 12 again, in accordance with the disclosure, upon the selection of the at least one OFZ and the at least one OFBW, at least one beam is formed. Thus, referring to FIG. 14 and FIG. 15, a beam forming method 1400 and a device 1500 implementing the beam forming method for a transmitting antenna 1501 are described below. Examples of the transmitting antenna 1501 can include, but not limited to, a beam antenna and an array antenna that can form one or more beams in a specific direction. The transmitting antenna 1501 can be integral part of a user terminal such as smart phone, wearable devices, and a virtual reality (VR) device, a base station, vehicle, autonomous small size robot such as drones, and Internet of Things (IoT) devices such as wireless modems, smart TV, etc. As such, the device 1500 can also be integral to the user terminal, the base station, the vehicle, the autonomous small size robot, and the IoT devices. The transmitting antenna 1501 transmits the signal in a direction of a receiving antenna (not shown in the figure). The receiving antenna can be integral part of a user terminal such as smart phone, wearable devices, and a virtual reality (VR) device, a base station, vehicle, autonomous small size robot such as drones, and Internet of Things (IoT) devices such as wireless modems, smart TV, etc.

At step 1401, at least one obstruction free zone and at least one obstruction free beam window are selected, as described in reference to various figures above. To perform the selection of the at least one OFZ and the at least one OFBW, the device 1500 includes a controller 1502. The controller 1502 further can include further units such as OFZ selection unit 203 and OFBW selection unit 204 described in FIG. 2; SRU 503, the FDU 504, the PDU 507, and the SDU 508 as described in FIG. 5; the DRU 1003, the LDU 1005, the FU 1006, the EU 1004, the ZEU 1009, the BWEU 1011, and the user-input receiving unit 1013 described in FIG. 10; and the LDU 1303, the RU 1304, the SU 1309, the GRU 1310, the FU 1311, the ZEU 1313, and the BWEU 1315 as described in FIG. 13 above.

At step 1402, at least one beam is formed based on said at least one OFBW thus selected. The at least one beam is formed based on the selected OFBW, i.e., window parameters selected based on satisfactions of certain predetermined conditions as described in various figures above. Accordingly, the step 1402 comprises further step 1403. At step 1403, the at least one beam is formed by controlling at least one beam parameter of the at least one beam based on window parameters of the at least one selected OFBW. The at least one beam parameter includes weight gain, frequency, phase, amplitude, direction, width, intensity, power, signal to noise ratio, signal to interference plus noise ratio, interference, output energy, variance, correlation, elevation angle, and azimuth angle. Thus, at the step 1403, at least one beam is formed by controlling the at least one parameter to satisfy a third set of conditions.

In one implementation, at step 1403, one beam is formed corresponding to each of the selected OFBW within the at least one selected OFZ. In another implementation, at step 1403, multiple beams are formed corresponding to each of the selected OFBW within the at least one selected OFZ.

In one implementation, at step 1403, the at least one beam is formed corresponding to a combination of plurality of selected OFBWs in the at least one selected OFZ. In another implementation, the at least one beam is formed corresponding to corresponding to at least one OFBW selected within an obstruction free zone formed from a combination of plurality of selected OFZ s.

To form the at least one beam, the device 1500 includes a beam-forming unit (BFU) 1503 similar to the beam-forming unit 205 as described in FIG. 2 and further figures as mentioned above. The BFU 1503 forms at least one beam in accordance with input, i.e., the window parameters of the selected OFBW provided by the controller 1502. The BFU 1503 can employ various techniques as known in the art to form the beam, as described earlier. Examples of such techniques include analogue beam forming technique, digital beam forming technique, hybrid beam forming technique, and physically moving the transmitting antenna. Examples of the digital beam forming technique include fixed beam forming technique, adaptive beam forming technique, azimuth beam forming technique, elevation beam forming technique, 2D beam forming technique, and 3D beam forming technique.

In the present disclosure, upon receiving the information about the selected OFBW from the controller 1502, the BFU 1503 continually controls the beam parameter(s) until the beam parameter(s) satisfies third set of predetermined conditions based on third set of predefined threshold values defined for the beam parameters. The third set of predetermined conditions includes at least one of:

a. comparing gain of the at least one beam with a predefined threshold value;
b. comparing frequency of the at least one beam with a predefined threshold value;
c. comparing phase of the at least one beam with a predefined threshold value;
d. comparing amplitude of the at least one beam with a predefined threshold value;
e. comparing direction of the at least one beam with a predefined threshold value;
f. comparing width of the at least one beam with a predefined threshold value;
g. comparing intensity of the at least one beam with a predefined threshold value;
h. comparing power of the at least one beam with a first predefined threshold value;
i. comparing signal to noise ratio of the at least one beam with a predefined threshold value;
j. comparing signal to interference plus noise ratio of the at least one beam with a predefined threshold value;
k. comparing interference of the at least one beam with a predefined threshold value;
l. comparing output energy of the at least one beam with a predefined threshold value;
m. comparing variance of the at least one beam with a predefined threshold value;
n. comparing correlation of the at least one beam with a predefined threshold value;
o. comparing elevation angle of the at least one beam with a predefined threshold value; and
p. comparing azimuth angle of the at least one beam with a predefined threshold value.

In one implementation, the third set of predefined threshold values, as indicated above, can be stored in a storage unit 1504 as third set of threshold value(s) 1505. It would be understood that the threshold value(s) might not be defined/set for all parameters. The threshold values may be added/updated/modified/ after the beam formation for subsequent evaluation/scanning.

As described earlier, in one implementation, the storage unit 1504 can be internal to the device 1500. In one example of such implementation, the device 1500 and the storage unit 1504 can be integral to a base station. In another implementation, the storage unit 1504 can be external to the device 1500. In one example of such implementation, the device 1500 can integral to a user terminal and the storage unit 1504 can associated with a network operator.

Accordingly, the BFU 1503 compares a value of the beam parameter (s) with the predefined threshold values 1505 and determines if the value is optimal with respect to the threshold value. In an implementation, the value is optimal if the value is lower than the predefined threshold value. In an implementation, the value is optimal if the value is higher than the predefined threshold value. Upon determining the value is optimal, the BFU 1503 determines the generated beam is a high directional and efficient beam that can transmit with minimal losses in the zone having negligible obstruction, i.e., the OFZ. In an example, the BFU 1503 forms the beam when beam parameters satisfy below conditions:

a. weight gain of the at least one beam is lower than a third predefined threshold value;
b. weight gain of the at least one beam is higher than a predefined threshold value;
c. weight gain of the at least one beam is equal to a predefined threshold value;
d. variance of the at least one beam is lower than a predefined threshold value;
e. output energy of the at least one beam is lower than a predefined threshold value;
f. power of the at least one beam is lower than a first predefined threshold value;
g. signal to noise ratio of the at least one beam is higher than a predefined threshold value;
h. signal to interference plus noise ratio of the at least one beam is higher than a predefined threshold value; and
i. interference of the at least one beam is lower than a predefined threshold value.

Further, in one implementation, the BFU 1503 may form one beam corresponding to each of the selected OFBW within the at least one selected OFZ. In another implementation, the BFU 1503 may form multiple beams corresponding to each of the selected OFBW within the at least one selected OFZ.

In one implementation, the BFU 1503 may form the at least one beam is formed corresponding to a combination of plurality of selected OFBWs in the at least one selected OFZ. In such implementation, the controller 1502 may select a plurality of OFBWs within the at least one selected zone OFZ, as described in reference to various figures above. During the beam formation, the controller 1502 may combine the plurality of OFBWs as per demand and need, for example, to form a beam having broader bandwidth. Accordingly, the BFU 1503 may form the at least one beam based on the combined plurality of OFBWs.

In another implementation, the at least one beam is formed corresponding to corresponding to at least one OFBW selected within a combination of plurality of selected OFZs. In such implementation, the controller 1502 may select a plurality of OFZs and then select at least one OFBW within each of the OFZs, as described in reference to various figures above. During the beam formation, the controller 1502 may combine the plurality of OFZs as per demand and need, for example, both transmitting antenna and the receiving antenna are mobile. The controller 1502 may then select at least one OFBW again within the combined OFZs. Accordingly, the BFU 1503 may form the at least one beam based on the at least one selected OFBW.

Upon forming the at least beam in accordance with the selected OFBW within the OFZ, the transmitting antenna 1501 then transmits a signal through the at least one formed beam in the direction of the receiving antenna. Accordingly, the device 1500 includes a transmitting and receiving unit (TRU) 1506. The transmitting and receiving unit 1506 controls and performs a function of transmitting a signal to the receiving antenna through the at least one beam formed by the BFU 1503. The transmitting antenna 1501 then transmits the signal in the direction of the receiving antenna.

Further, at step 1404, at least one of functions such as storing, transmitting, metadata associating, tagging, ranking, and recommending, is performed with respect to data pertaining to one or more of (a) said at least one obstruction free zone, (b) said at least one obstruction free beam window, and (c) said at least one beam.

Thus, in one implementation, at step 1404, data pertaining to one or more of (a) said at least one obstruction free zone, (b) said at least one obstruction free beam window, and (c) said at least one beam is stored in a storage unit. In such implementation, the controller 1502 can store the data pertaining to one or more of (a) said at least one obstruction free zone and (b) said at least one obstruction free beam window in the storage unit 1504. Similarly, the BFU 1503 can store data pertaining to the at least one formed beam, i.e., the beam parameters in the storage unit 1504. Such data can be stored as a stored data 1507.

In one implementation, at step 1404, metadata is associated with one or more of (a) said at least one obstruction free zone, (b) said at least one obstruction free beam window, and (c) said at least one beam and said metadata is stored in the storage unit. In such implementation, any one or all of the controller 1502, the BFU 1503, and the TRU 1506 may generate metadata indicating beam experience as good, bad, better, worst, etc., and/or signal transmission result as successful, unsuccessful, etc. upon transmission of the signal by the transmitting antenna 1501. The generated metadata may then be associated with the one or more of (a) said at least one obstruction free zone, (b) said at least one obstruction free beam window, and (c) said at least one beam. The associated metadata is then stored in the storage unit 1504 as the stored data 1507. Such metadata can be used for performing OFZ selection and OFBW selection later, as described above. In addition, to the beam experience and transmission result, the controller 1502, the BFU 1503, and the TRU 1506 can determine corresponding geographical location, time-period, and other details corresponding to (a) the OFZ such as area, (b) OFBW, and (c) formed beam such as power and beam width, and store as metadata in the storage unit 1504.

In one implementation, at step 1404, data pertaining to one or more of (a) said at least one obstruction free zone, (b) said at least one obstruction free beam window, and (c) said at least one beam is transmitted to a receiver. In such implementation, the controller 1502 includes a data-transmitting unit 1508 to transmit the stored data 1507 to a receiver (not shown in the figure) automatically upon or prior to or along with transmission of the signal by the transmitting antenna 1501. Examples of such receiver include, but not limited to, user terminal such as smart phone, wearable devices, and a virtual reality (VR) device, a base station, vehicle, autonomous small size robot such as drones, and Internet of Things (IoT) devices such as wireless modems, smart TV, etc. The data-transmitting unit 1508 may transmit the stored data 1507 using techniques as known in the art.

In one implementation, at step 1404, a further user-input indicative of access control information is received. The access control information is then stored in the storage unit in a mapped relationship with data pertaining one or more of (a) said at least one obstruction free zone, (b) said at least one obstruction free beam window, and (c) said at least one beam. In such implementation, the controller 1502 includes a user-input receiving unit 1509, as described in earlier figures above. The user-input is received via an input unit communicative coupled with the user terminal, the base station, the vehicle, and the autonomous small size robot of which the device 1500 is the integral part, as described earlier. The user-input receiving unit 1509 receiving the user-input indicative of access control information. As would be understood, the access control information provides information of users and/or devices/apparatuses/systems that can access the stored data 1507, thereby providing selective access to the storage unit 1504. Upon receiving the access control information, the controller 1502 stores the access control information in a mapped relationship with data related to OFAZ, OFBW, beam, and metadata as the stored data in the storage unit 1504. In a similar manner, the controller 1502 may receive data from the receiver and store the received data in the storage unit 1504 as the stored data 1507.

In one implementation, at step 1404, a further user-input indicative of tagging one or more of (a) said at least one obstruction free zone, (b) said at least one obstruction free beam window, and (c) said at least one beam is received. In such implementation, the controller 1502 may present the aforesaid data on a display unit (not shown in the figure) in a manner as known in the art. Upon presenting the data, the user-input receiving unit 1509 receives the user-input indicative of tagging the data. The tagging of data can be indicative of beam experience as good, bad, better, worst, etc., and/or signal transmission result as successful, unsuccessful, etc. Upon receiving the user-input, the controller 1502 stores the data in in a mapped relationship with data related to OFAZ, OFBW, beam, and metadata as the stored data in the storage unit 1504.

In one implementation, at step 1404, a further user-input indicative of ranking one or more of (a) said at least one obstruction free zone, (b) said at least one obstruction free beam window, and (c) said at least one beam is received. The ranking is then stored in the storage unit. In such implementation, the controller 1502 may present the aforesaid data on the display unit, in a manner as known in the art. Upon presenting the data, the user-input receiving unit 1509 receives the user-input indicative of ranking the data. The ranking can be based on at least one of beam experience, signal transmission result, geographical location, time-period, and other details corresponding to (a) the OFZ such as area, (b) OFBW, and (c) formed beam such as power and beam width. Upon receiving the user-input, the controller 1502 stores the data in in a mapped relationship with data related to OFAZ, OFBW, beam, and metadata as the stored data in the storage unit 1504. In a similar manner, the controller 1502 may receive ranking via the data sharing application and store the recommendation in the storage unit 1504 as the stored data 1507. In addition, the received data can be stored with respect to each user. In addition, the received data can be stored with respect to each user. This enables selection of required data based on users. For example, user A receives recommendation from user B and user C. Thus, when user A again tries to send data using the present disclosure to user B, the data corresponding to user B will be preferred. Similarly, when user A again tries to send data using the present disclosure to user C, the data corresponding to user C will be preferred. In addition, the reception of data pertaining to other users enables performing a combined evaluation of data for selecting most suitable OFZ and OFBW.

In one implementation, at step 1404, a further user-input indicative of sharing data pertaining to one or more of (a) said at least one obstruction free zone, (b) said at least one obstruction free beam window, and (c) said at least one beam via at least one data sharing application is received. In such implementation, the controller 1502 may be linked/connected with a data sharing application via mechanism knows in the art. Examples of such data sharing application include, but not limited to, a chat application, an instant messaging application, a messaging application, and social media application. Examples of such mechanisms include, but not limited to, extensions, plug-ins, and in-built mechanisms. Accordingly, the user-input receiving unit 1509 receives the user-input indicative of sharing the data sharing application. Upon receiving the user-input, the controller 1502 enables the user to select and share data in a manner as known in the art. In a similar manner, the controller 1502 may receive data via the data application and store the received data in the storage unit 1504 as the stored data 1507. In addition, the reception of data pertaining to other users enables performing a combined evaluation of data for selecting most suitable OFZ and OFBW.

In one implementation, at step 1404, a further user-input indicative of recommending data pertaining to one or more of (a) said at least one obstruction free zone, (b) said at least one obstruction free beam window, and (c) said at least one beam via the at least one data sharing application is received. In such implementation, the user-input receiving unit 1509 receives the user-input indicative of sharing the data sharing application, as described above. Upon receiving the user-input, the controller 1502 enables the user to select and recommend data in a manner as known in the art. The recommendation can be based on at least one of beam experience, signal transmission result, geographical location, time-period, and other details corresponding to (a) the OFZ such as area, (b) OFBW, and (c) formed beam such as power and beam width. In a similar manner, the controller 1502 may receive recommendation via the data sharing application and store the recommendation in the storage unit 1504 as the stored data 1507. In addition, the received data can be stored with respect to each user. This enables selection of required data based on users. For example, user A receives recommendation from user B and user C. Thus, when user A again tries to send data using the present disclosure to user B, the data corresponding to user B will be preferred. Similarly, when user A again tries to send data using the present disclosure to user C, the data corresponding to user C will be preferred. In addition, the reception of data pertaining to other users enables performing a combined evaluation of data for selecting most suitable OFZ and OFBW. Although, the above description explains the method of beam forming in accordance with the disclosure for the transmitting antenna, it is to be understood that same method can be implemented for the receiving antenna. As such, the receiving antenna may also be coupled with a device (not shown in the figure) having units as explained above. According to the disclosure, the device includes a controller (not shown in the figure), beam-forming unit (not shown in the figure), and transmitting and receiving unit (not shown in the figure). The controller may then select at least one OFZ in the direction of the transmitting antenna 501 and further select at least one OFBW within the at least one selected OFZ. The controller may perform the selections using any of the modes, i.e., fully automatic mode, semi-automatic mode, and manual mode, as described above. Upon selecting the at least one OFBW, the beam forming unit may form at least one beam and the transmitting and receiving unit mat transmit a signal to the transmitting antenna through the at least one beam.

Thus, the present disclosure enables selection of the at least one OFBW based on obstruction information, which can be determined either by from reflected signals or from previously stored information. This reduces time required to search for a beam path with minimal propagation loss. Further, the present disclosure enables formation of efficient beam(s) based on at least one OFBW, thereby reducing time to set beam direction and beam losses.

As such, the present disclosure can be implemented for various communication systems for transmitting and receiving signals with minimal losses and minimal delay. Examples of communication systems include, but not limited to, Multiple Input Multiple Output (MIMO) communication systems, Multiple Input Single Output (MISO) communication systems, Single Input Multiple Output (SIMO) communication systems, etc.

Similarly, the present disclosure can be implemented within devices/systems/apparatus operating in various wireless/cellular networks for transmitting and receiving data with minimal losses and minimal delay. Examples of network include, but not limited to, indoor wireless networks, outdoor wireless networks, core network interfaces, back end networks, cloud based networks such as device-to-device (D2D) network and machine-to-machine (M2M) network, etc.

Further, the present disclosure can be implemented in radar based wireless gesture sensing techniques. Furthermore, the present disclosure can be implemented for target object detection by filtering non-interested areas or filter obstructions.

Figure 16:
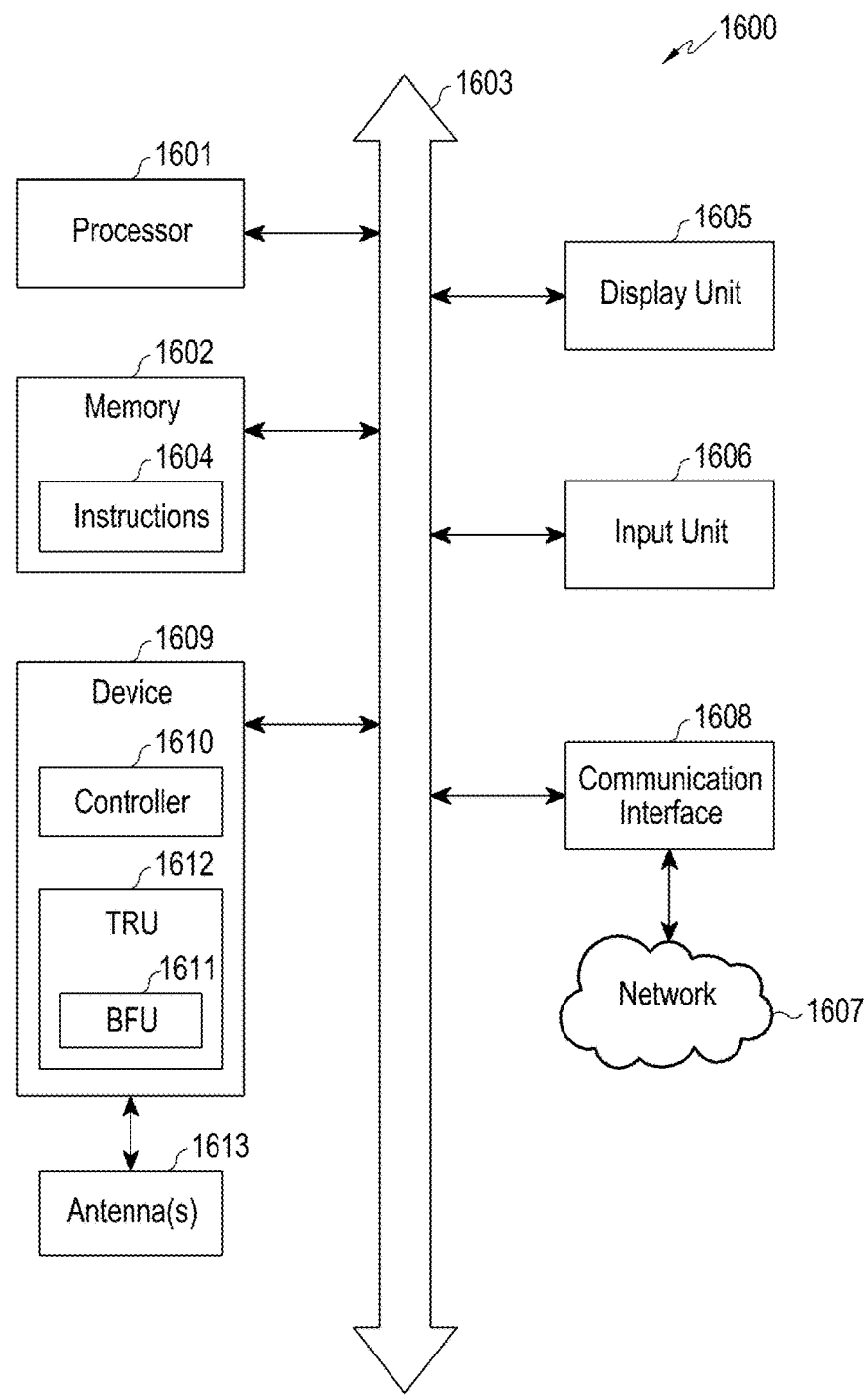
FIG. 16 is a block diagram illustrating an example of architecture of a system configured for use in wireless communication, in accordance with aspects of the present disclosure.

FIG. 16 is a block diagram illustrating an example of architecture of a system 1600 configured for use in wireless communication, in accordance with aspects of the present disclosure. The system 1600 can be part of Multiple Input Multiple Output (MIMO) communication systems, Multiple Input Single Output (MISO) communication systems, Single Input Multiple Output (SIMO) communication systems, etc., that can send or receive signals in either of indoor environments and outdoor environments. Thus, in one implementation, the system 1600 can be user terminal such as smart phone, wearable devices, and a virtual reality (VR) device, autonomous small size robot such as drones, and Internet of Things (IoT) devices such as wireless modems, smart TV, etc. In another implementation, the system 1600 can also be part of a vehicle.

The system 1600 may include a processor 1601, e.g., a central processing unit (CPU), a graphics processing unit (GPU), or both. The processor 1601 may be a component in a variety of systems. For example, the processor 1601 may be part of a standard personal computer or a workstation. The processor 1601 may be one or more general processors, digital signal processors, application specific integrated circuits, field programmable gate arrays, servers, networks, digital circuits, analog circuits, combinations thereof, or other now known or later developed devices for analysing and processing data The processor 1601 may implement a software program, such as code generated manually (i.e., programmed).

The system 1600 may include a memory 1602, such as a memory 1602 that can communicate via a bus 1603. The memory 1602 may be a main memory, a static memory, or a dynamic memory. The memory 1602 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 1602 includes a cache or random access memory for the processor 1601. In alternative examples, the memory 1602 is separate from the processor 1601, such as a cache memory of a processor, the system memory, or other memory. The memory 1602 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 1602 is operable to store instructions 1604 executable by the processor 1601. The functions, acts or tasks illustrated in the figures or described may be performed by the programmed processor 1601 executing the instructions stored in the memory 1602. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The system 1600 may further include a display unit 1605, such as a liquid crystal display (LCD), an organic light emitting diode (OLED), a flat panel display, a solid state display, a cathode ray tube (CRT), a projector, a printer or other now known or later developed display device for outputting determined information. The display unit 1605 may act as an interface for the user to see the functioning of the processor 1601, or other units. The system 1600 may further include other output devices (not shown in the figure).

The system 1600 may further include input 1606 configured to allow a user to interact with any of the components of system 1600. The input device may be a number pad, a keyboard, or a cursor control device, such as a mouse, or a joystick, touch screen display, remote control or any other device operative to interact with the system 1600.

The system 1600 may be connected to a network 1607 to communicate voice, video, audio, images or any other data over the network 1607. Further, the instructions 1604 may be transmitted or received over the network 1607 via a communication port or network 1607 or using the bus 1603. The communication port or network 1607 may be a part of the processor 1601 or may be a separate component. The communication port 1608 may be created in software or may be a physical connection in hardware. The communication port 1608 may be configured to connect with the network 1607, external media, the display unit 1605, or any other components in system 1600, or combinations thereof. The connection with the network 1607 may be a physical connection, such as a wired Ethernet connection or may be established wirelessly as discussed later. Likewise, the additional connections with other components of the system 1600 may be physical connections or may be established wirelessly. The network 1607 may alternatively be directly connected to the bus 1603.

The network 1607 may include wired networks, wireless networks, Ethernet AVB networks, or combinations thereof. The wireless network may be a cellular telephone network, an 802.11, 802.16, 802.20, 802.1Q or Wi Max network. Further, the network 1607 may be a public network, such as the Internet, a private network, such as an intranet, or combinations thereof, and may utilize a variety of networking protocols now available or later developed including, but not limited to TCP/IP based networking protocols.

The system 1600 may further include a device 1609 for forming a beam in accordance with the present disclosure. The device 1609 can include a controller 1610 to select at least one obstruction free zone and at one obstruction free beam window, as described in various embodiments above. The device 1609 further includes forming unit (BFU) 1611 within a transmitting and receiving unit (TRU) 1612. The BFU 1611 forms at least one beam based on the selected OFBW, i.e., the selected window parameters of beam window identified as the OFBW by the controller 1610, as described in various embodiments above. The TRU 1612 transmits or receives a signal to/from a receiver through the at least one beam formed by the BFU 1611 via one or more antennas 1613. In one implementation, the antenna(s) 1613 transmit or receive the signal over millimeter waves (mmWV). Examples of the antenna(s) 1613 can include, but not limited to, a beam antenna and an array antenna that can form one or more beams in a specific direction.

Further, in one implementation, the device 1609 can be a separate component. In one implementation, the device 1609 can be part of a dedicated radio frequency (RF) unit (not shown in the figure) connected to the antenna(s) 1613. In one implementation, the device 1609 can be a software component implemented in a physical layer of a digital radio frequency interface, as per current communications standards.

Further, the receiver can be part of Multiple Input Multiple Output (MIMO) communication systems, Multiple Input Single Output (MISO) communication systems, Single Input Multiple Output (SIMO) communication systems, etc., that can send or receive signals in either of indoor environments and outdoor environments. For example, the receiver can be a base station, a user-terminal, a vehicle, an IOT device, and an autonomous small size robot.

Although, specific components have been illustrated in the figure, the system 1600 may include further components (hardware/software/combination thereof) necessary for proper functioning/operation of the system 1600 as required.

Figure 17:
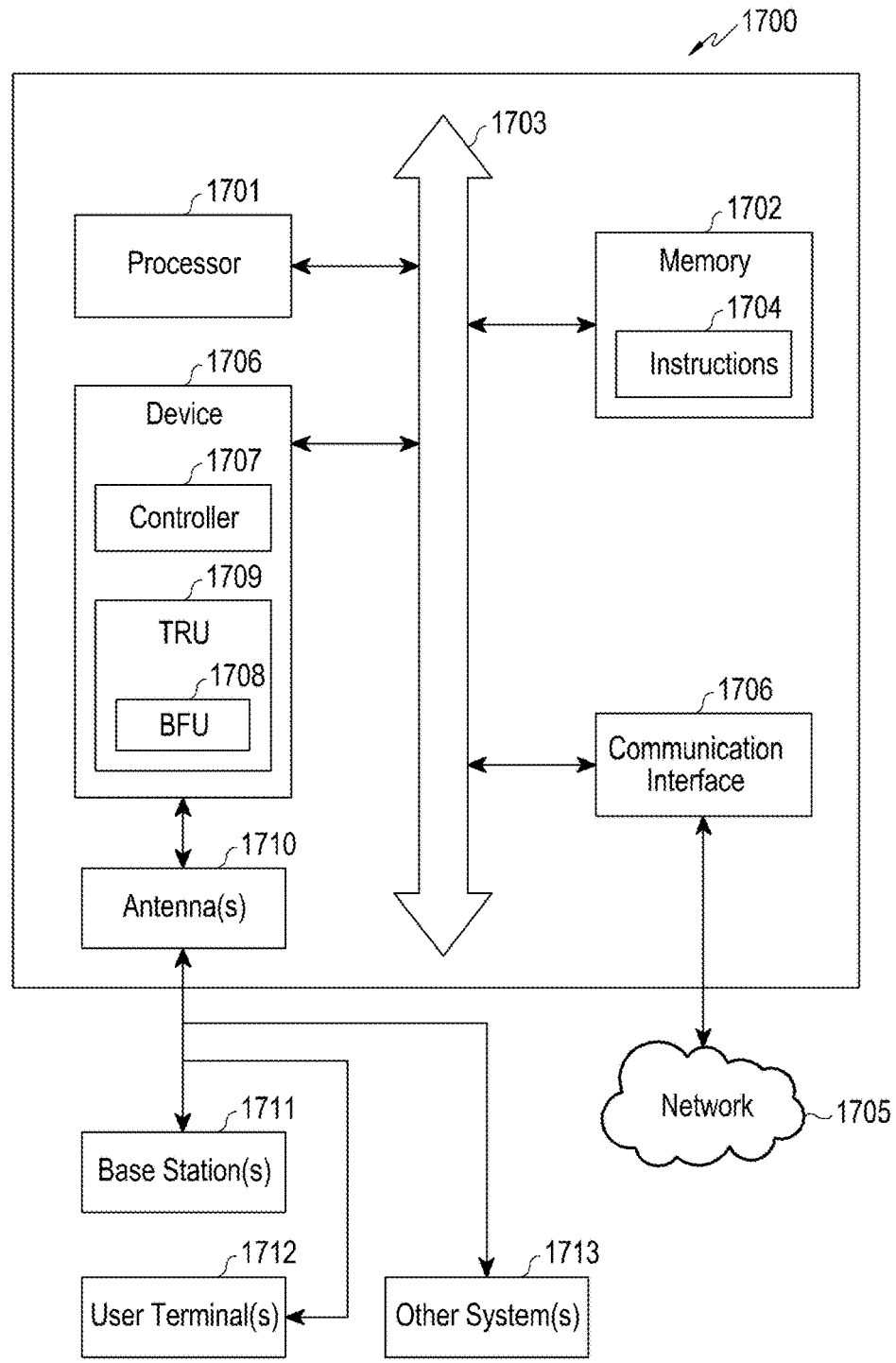
FIG. 17 is a block diagram illustrating an example of architecture of a base station configured for use in wireless communication, in accordance with aspects of the present disclosure.

FIG. 17 is a block diagram illustrating an example of architecture of a system 1700 configured for use in wireless communication, in accordance with aspects of the present disclosure. The system 1700 can be base station.

The system 1700 may include a processor 1701, e.g., a central processing unit (CPU), a graphics processing unit (GPU), or both. The processor 1701 may be a component in a variety of systems. For example, the processor 1701 may be part of a standard personal computer or a workstation. The processor 1701 may be one or more general processors, digital signal processors, application specific integrated circuits, field programmable gate arrays, servers, networks, digital circuits, analog circuits, combinations thereof, or other now known or later developed devices for analysing and processing data The processor 1701 may implement a software program, such as code generated manually (i.e., programmed).

The system 1700 may include a memory 1702, such as a memory 1702 that can communicate via a bus 1703. The memory 1702 may be a main memory, a static memory, or a dynamic memory. The memory 1702 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 1702 includes a cache or random access memory for the processor 1701. In alternative examples, the memory 1702 is separate from the processor 1701, such as a cache memory of a processor, the system memory, or other memory. The memory 1702 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 1702 is operable to store instructions 1704 executable by the processor 1701. The functions, acts or tasks illustrated in the figures or described may be performed by the programmed processor 1701 executing the instructions stored in the memory 1702. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The system 1700 may be connected to a network 1705 to communicate voice, video, audio, images or any other data over the network 1705. Further, the instructions 1704 may be transmitted or received over the network 1705 via a communication port or network 1705 or using the bus 1703. The communication port or network 1705 may be a part of the processor 1701 or may be a separate component. The communication port may be created in software or may be a physical connection in hardware. The communication port may be configured to connect with the network 1705, external media, a display unit (not shown in the figure), or any other components in system 1700, or combinations thereof. The connection with the network 1705 may be a physical connection, such as a wired Ethernet connection or may be established wirelessly as discussed later. Likewise, the additional connections with other components of the system 1700 may be physical connections or may be established wirelessly. The network 1705 may alternatively be directly connected to the bus 1703.

The network 1705 may include wired networks, wireless networks, Ethernet AVB networks, or combinations thereof. The wireless network may be a cellular telephone network, an 802.11, 802.16, 802.20, 802.1Q or Wi Max network. Further, the network 1705 may be a public network, such as the Internet, a private network, such as an intranet, or combinations thereof, and may utilize a variety of networking protocols now available or later developed including, but not limited to TCP/IP based networking protocols.

The system 1700 may further include a device 1706 for forming a beam in accordance with the present disclosure. The device 1706 can include a controller 1707 to select at least one obstruction free zone and at one obstruction free beam window, as described in various embodiments above. The device 1706 further includes forming unit (BFU) 1708 within a transmitting and receiving unit (TRU) 1709. The BFU 1708 forms at least one beam based on the selected OFBW, i.e., the selected window parameters of beam window identified as the OFBW by the controller 1707, as described in various embodiments above. The TRU 1709 transmits or receives a signal to/from a receiver through the at least one beam formed by the BFU 1708 via one or more antennas 1710. In one implementation, the antenna(s) 1710 transmit or receive the signal over millimeter waves (mmWV). Examples of the antenna(s) 1710 can include, but not limited to, a beam antenna and an array antenna that can form a beam in a specific direction. The receiver can be base station(s) 1711, user-terminal(s) 1712 such as smart phone whose architecture was illustrated in FIG. 16, and other system(s) 1713 such as a IOT device, vehicle, and an autonomous small size robot.

Figure 18:
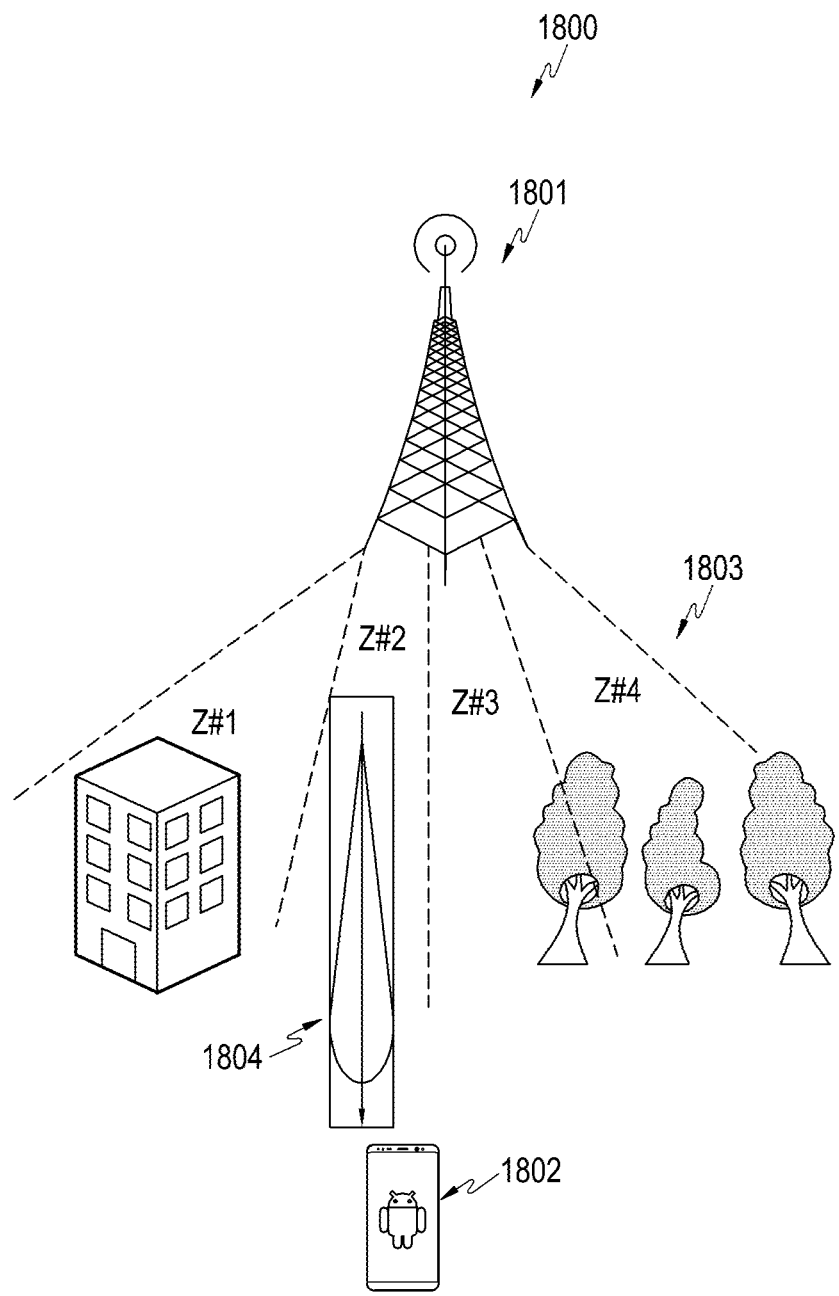
FIG. 18 illustrates a first example in which a base station is implementing the method for beam forming to transmit data to a smart phone in accordance with aspects of the present disclosure.
Figure 19:
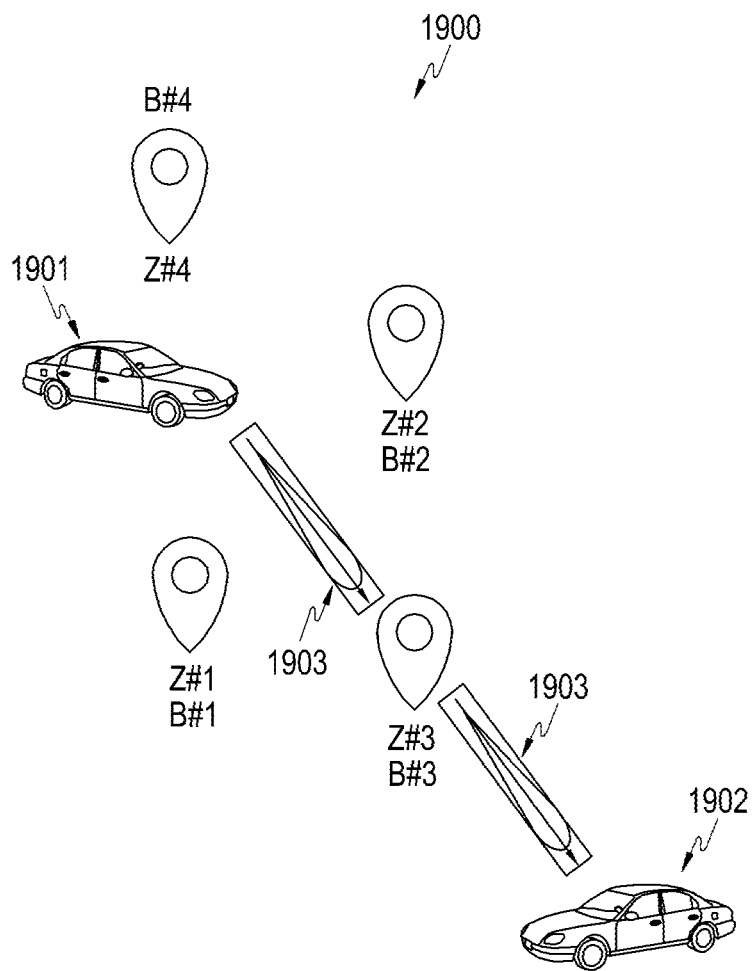
FIG. 19 illustrates a second example in which a vehicle or smart car is implementing the method for beam forming to transmit data to a vehicle in accordance with aspects of the present disclosure.
Figure 20:
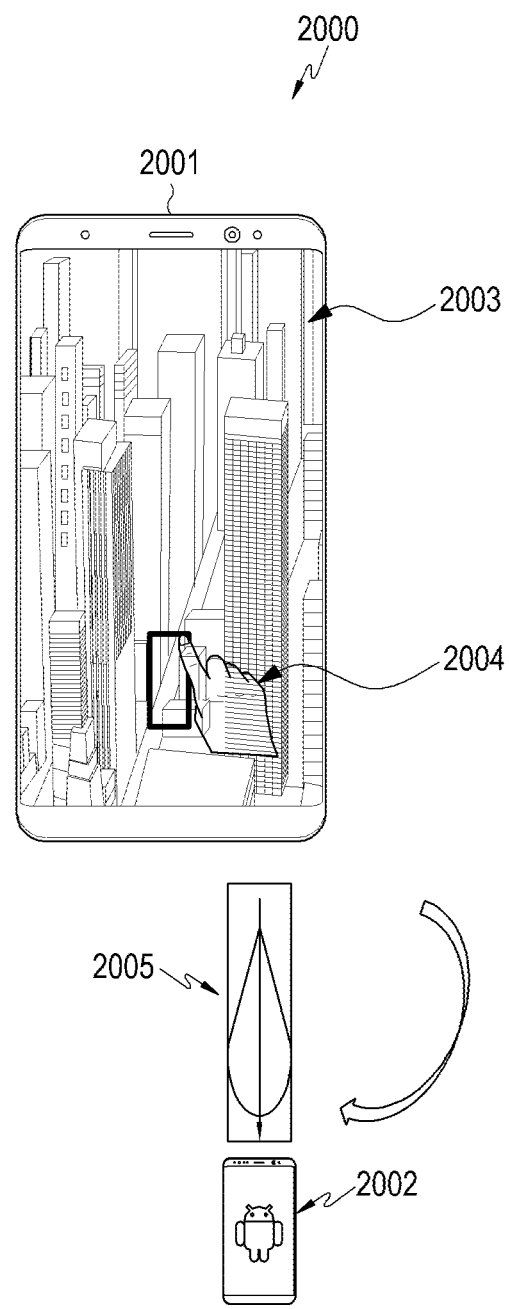
FIG. 20 illustrates a second example in which a smartphone is implementing the method for beam forming to transmit data to a smartphone in accordance with aspects of the present disclosure.

FIGS. 18 to 20 illustrate various examples of implementing the method for beam forming, in accordance with the present disclosure.

FIG. 18 illustrates a first example 1800 in which a base station 1801 is implementing the method for beam forming to transmit data to a smart phone 1802. The base stations 1801 includes a device (not shown in the figure) to implement the method for beam forming as described earlier. As illustrated, between the base station 1801 and the smart phone 1802 various zones 1803 are marked (represented by solid lines). Zones Z#1 and Z#4 include obstructions as tree and a building respectively, whereas zones Z#2 does not include obstructions and Z#3 includes negligible obstructions. The devices selects zone Z#2 as obstruction free zone (OFZ) based on reflected signals received from all zones, as described earlier with respect to fully automatic mode of operation. For the sake of brevity, selection of one zone as OFZ is illustrated. Upon selecting the OFZ, the device selects at least one obstruction free beam window (OFBW) and accordingly forms a beam 1804, as described earlier with respect to fully automatic mode of operation. Thereafter, the device transmits data via a transmitting antenna in direction of the smart phone 1802.

FIG. 19 illustrates a second example 1900 in which a vehicle or smart car 1901 is implementing the method for beam forming to transmit data to a vehicle 1902. The vehicle 1901 includes a device (not shown in the figure) to implement the method for beam forming as described earlier. The device determines a current location of the vehicle 1901 and fetches data pertaining to (a) one or more zones and (b) one or more beam windows based on the current location, as described earlier with respect to semi-automatic mode of operation. For sake of brevity four zones Z#1, Z#2, Z#3, and Z#4 and corresponding beam windows details B #1, B#2, B#3, and B#4 are illustrated. The device selects Z#3 as the obstruction free zone (OFZ) by evaluating the data pertaining to the zones, as described earlier with respect to semi-automatic mode of operation. Upon selecting the OFZ, the device selects at least one obstruction free beam window (OFBW) and accordingly forms a beam 1903, as described earlier with respect to semi-automatic mode of operation. Thereafter, the device transmits data via a transmitting antenna in direction of the vehicle 1902.

FIG. 20 illustrates a second example 2000 in which a smartphone 2001 is implementing the method for beam forming to transmit data to a smartphone 2002. The smartphone 2001 includes a device (not shown in the figure) to implement the method for beam forming as described earlier. The device determines a current location and presents a visual representation 2003 on the smartphone 2001, as described earlier with respect manual mode of operation. The visual representation 2003 indicates various obstructions and zones available at the current location. Upon presenting the visual representation 2003, the device receives a gesture-input 2004 from a user on the visual representation 2003. The device determines area corresponding to the geographical location and a beam direction in which a beam is to be formed from the gesture input. Based on the area and the beam direction, the device fetches pre-stored data corresponding to obstruction free zones (OFZ) and evaluates the data to select an OFZ, as described earlier with respect to manual mode of operation. Upon selecting the OFZ, the device selects at least one obstruction free beam window (OFBW) and accordingly forms a beam 2005, as described earlier with respect to manual mode of operation. Thereafter, the device transmits data via a transmitting antenna in direction of the smartphone 2002.

While certain present preferred embodiments of the disclosure have been illustrated and described herein, it is to be understood that the disclosure is not limited thereto. Clearly, the disclosure may be otherwise variously embodied, and practiced within the scope of the following claims.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of beam forming for a transmitting antenna, the method comprising:
    identifying reflection information related to a reflected signal received from each of one or more zones;
    determining, as an obstruction free zone, a zone corresponding to reflection information satisfying at least one first condition among the one or more zones;
    identifying beam window information related to a reflected signal received from each of one or more beam windows within the determined obstruction free zone;
    determining, as an obstruction free beam window, a beam window corresponding to beam window information satisfying at least one second condition among the one or more beam windows; and
    forming a beam based on the determined obstruction free beam window.

2. The method as claimed in claim 1,
    wherein the reflection information related to the reflected signal received from each of the one or more zones includes at least one of an intensity, an angle of arrival (AOA), an elevation angle, an azimuth angle, a frequency/Doppler shift, a time of arrival (TOA), a time difference of arrival (TDOA), a power of the reflected signal received from each of the one or more zones, a signal to noise ratio, a signal to interference plus noise ratio, an interference, an offset, a coherent energy, an incoherent energy, a variance, a correlation, and characteristics of at least one obstruction derived from the reflected signal received from each of the one or more zones.

3. The method as claimed in claim 2, wherein the characteristics include at least one of a depth of the at least one obstruction, a width of the at least one obstruction, and a property of the at least one obstruction.

4. The method as claimed in claim 1, wherein the at least one first condition includes at least one of:
    a condition that an intensity of the reflected signal received from each of the one or more zones is lower than a threshold value;
    a condition that a variance of the reflected signal received from each of the one or more zones is lower than a threshold value;
    a condition that a frequency of the reflected signal received from each of the one or more zones is higher than a threshold value;
    a condition that a time of arrival (TOA) of the reflected signal received from each of the one or more zones is higher than a threshold value;
    a condition that an angle of arrival (AOA) of the reflected signal received from each of the one or more zones is less than a threshold value;
    a condition that a power of the reflected signal received from each of the one or more zones is lower than a threshold value;
    a condition that a signal to noise ratio for each of the one or more zones is lower than a threshold value;
    a condition that a signal to interference plus noise ratio for each of the one or more zones is lower than a threshold value; and
    a condition that an interference for each of the one or more zones is lower than a threshold value.

5. The method as claimed in claim 1, wherein the beam window information for each of the one or more beam windows includes a length of a corresponding beam window and a parameter controlling spectral characteristics of the corresponding beam window.

6. The method as claimed in claim 1, wherein the at least one second condition includes at least one of:
    a condition that a bandwidth of the reflected signal received from each of the one or more beam windows is lower than a threshold value;
    a condition that an intensity of the reflected signal received from each of the one or more beam windows is lower than a threshold value;
    a condition that a frequency of the reflected signal received from each of the one or more beam windows is higher than a threshold value; and
    a condition that a power of the reflected signal received from each of the one or more beam windows is lower than a threshold value.

7. A device for beam forming for a transmitting antenna, the device comprising:
    a transceiver; and
    at least one processor configured to:
        control the transceiver to receive a reflected signal from each of one or more zones, and identify reflection information related to the reflected signal received from each of the one or more zones,
        determine, as an obstruction free zone, a zone corresponding to reflection information satisfying at least one first condition among the one or more zones,
        control the transceiver to receive a reflected signal from each of one or more beam windows within the determined obstruction free zone, and identify beam window information related to the reflected signal received from each of the one or more beam windows,
        determine, as an obstruction free beam window, a beam window corresponding to data satisfying at least one second condition among the one or more beam windows, and
        form a beam based on the determined obstruction free beam window.

8. The device as claimed in claim 7, wherein the reflection information related to the reflected signal received from each of the one or more zones includes at least one of an intensity, an angle of arrival (AOA), an elevation angle, an azimuth angle, a frequency/Doppler shift, an time of arrival (TOA), a time difference of arrival (TDOA), a power of the reflected signal received from each of the one or more zones, a signal to noise ratio, a signal to interference plus noise ratio, an interference, offset, a coherent energy, an incoherent energy, a variance, a correlation, and characteristics of at least one obstruction derived from the reflected signal received from each of the one or more zones.

9. The device as claimed in claim 8, wherein the characteristics include at least one of a depth of the at least one obstruction, a width of the at least one obstruction, and a property of the at least one obstruction.

10. The device as claimed in claim 7, wherein the at least one first condition includes at least one of:
- a condition that an intensity of the reflected signal received from each of the one or more zones is lower than a threshold value;
- a condition that a variance of the reflected signal received from each of the one or more zones is lower than a threshold value;
- a condition that a frequency of the reflected signal received from each of the one or more zones is higher than a threshold value;
- a condition that a time of arrival (TOA) of the reflected signal received from each of the one or more zones is higher than a threshold value;
- a condition that an angle of arrival (AOA) of the reflected signal received from each of the one or more zones is less than a threshold value;
- a condition that a power of the reflected signal received from each of the one or more zones is lower than a threshold value;
- a condition that a signal to noise ratio for each of the one or more zones is lower than a threshold value;
- a condition that a signal to interference plus noise ratio for each of the one or more zones is lower than a threshold value; and
- a condition that an interference for the one or more zones is lower than a threshold value.

11. The device as claimed in claim 7, wherein the beam window information for each of the one or more beam windows includes a length of a corresponding beam window and a parameter controlling spectral characteristics of the corresponding beam window.

12. The device as claimed in claim 7, wherein the at least one second condition includes at least one of:
- a condition that a bandwidth of the reflected signal received from each of the one or more beam windows is lower than a threshold value;
- a condition that an intensity of the reflected signal received from each of the one or more beam windows is lower than a threshold value;
- a condition that a frequency of the reflected signal received from each of the one or more beam windows is higher than a threshold value; and
- a condition that a power of the reflected signal received from each of the one or more beam windows is lower than a threshold value.

* * * * *